Figure 1:
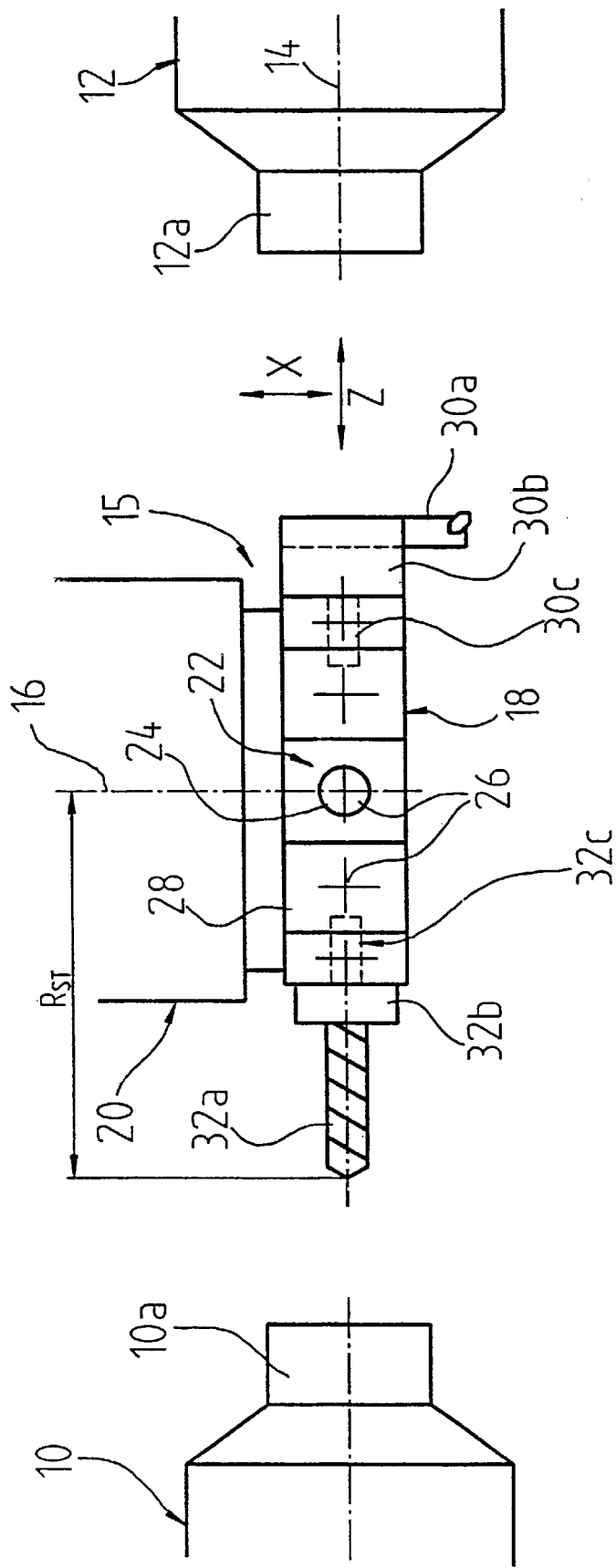

United States Patent [19]
Link et al.

[11] Patent Number: 6,128,812
[45] Date of Patent: Oct. 10, 2000

[54] TOOL TURRET FOR A MACHINE TOOL AND LATHE WITH SUCH A TOOL TURRET

[75] Inventors: Helmut Friedrich Link, Aichwald; Walter Grossmann, Baltmannsweiler, both of Germany

[73] Assignee: Index-Werke GmbH & Co. KG Hahn & Tessky, Esslingen, Germany

[21] Appl. No.: 09/150,390

[22] Filed: Sep. 9, 1998

[30] Foreign Application Priority Data

Sep. 13, 1997 [DE] Germany .............................. 197 40 379

[51] Int. Cl.⁷ .............................. B23B 3/30; B23B 29/24
[52] U.S. Cl. .................................. 29/40; 29/27 C; 29/36; 29/48.5 A; 82/127; 82/159
[58] Field of Search .................................. 29/36, 39, 40, 29/27 R, 27 C, 48.5 A, 48.5 R; 82/127, 159, 121

[56] References Cited

U.S. PATENT DOCUMENTS

| | | |
|---|---|---|
| 2,685,122 | 8/1954 | Berthiez . |
| 3,955,257 | 5/1976 | Herbst et al. .............................. 29/36 |
| 4,061,061 | 12/1977 | Lahm et al. .............................. 82/127 |
| 4,297,925 | 11/1981 | Ishizuka et al. ...................... 82/159 X |
| 4,700,442 | 10/1987 | Lahm ....................................... 29/39 |
| 4,741,078 | 5/1988 | Kimura ..................................... 29/39 |
| 4,819,311 | 4/1989 | Hashimoto et al. ......................... 29/40 |
| 5,293,793 | 3/1994 | Hessbrüggen et al. .................. 82/121 |
| 5,842,289 | 12/1998 | Hardesty et al. ..................... 29/48.5 A |

FOREIGN PATENT DOCUMENTS

| | | |
|---|---|---|
| 25 26 342 | 6/1975 | Germany . |
| 26 30 229 | 7/1976 | Germany . |
| 35 28437 | 8/1985 | Germany . |

OTHER PUBLICATIONS

Index G30/150NC; German Brochure by Index–Werke KG, Printed Nov. 1977.

*Primary Examiner*—William Briggs

[57] ABSTRACT

In a tool turret for a machine tool, in particular, a lathe, comprising a turret head rotatable about a turret indexing axis, the turret head tapering on either side of a diameter plane of the turret head extending perpendicularly to the turret indexing axis and having on each side of this diameter plane a circular ring-shaped row of tool stations which is concentric with the indexing axis, each of the tool stations having a tool receiving means for clamping a toolholder for a machining tool, in order to increase the machining operations which are performable with a tool turret and the machining accuracy, such a tool turret is so designed that: each tool station comprises a planar contact surface formed by the outer surfaces of the turret head for a toolholder; the contact surfaces of the two rows of tool stations define regular pyramids of identical shape which point away from one another and whose axes coincide with the turret indexing axis; each row of tool stations has at least one tool receiving means for a drivable tool, and the axis of the tool receiving means extends perpendicularly to the contact surface of the respective tool station; and two adjacent tool receiving means for drivable tools belong to different rows of tool stations and are offset from one another with respect to angle of rotation in relation to the turret indexing axis.

17 Claims, 16 Drawing Sheets

CROWN TURRET

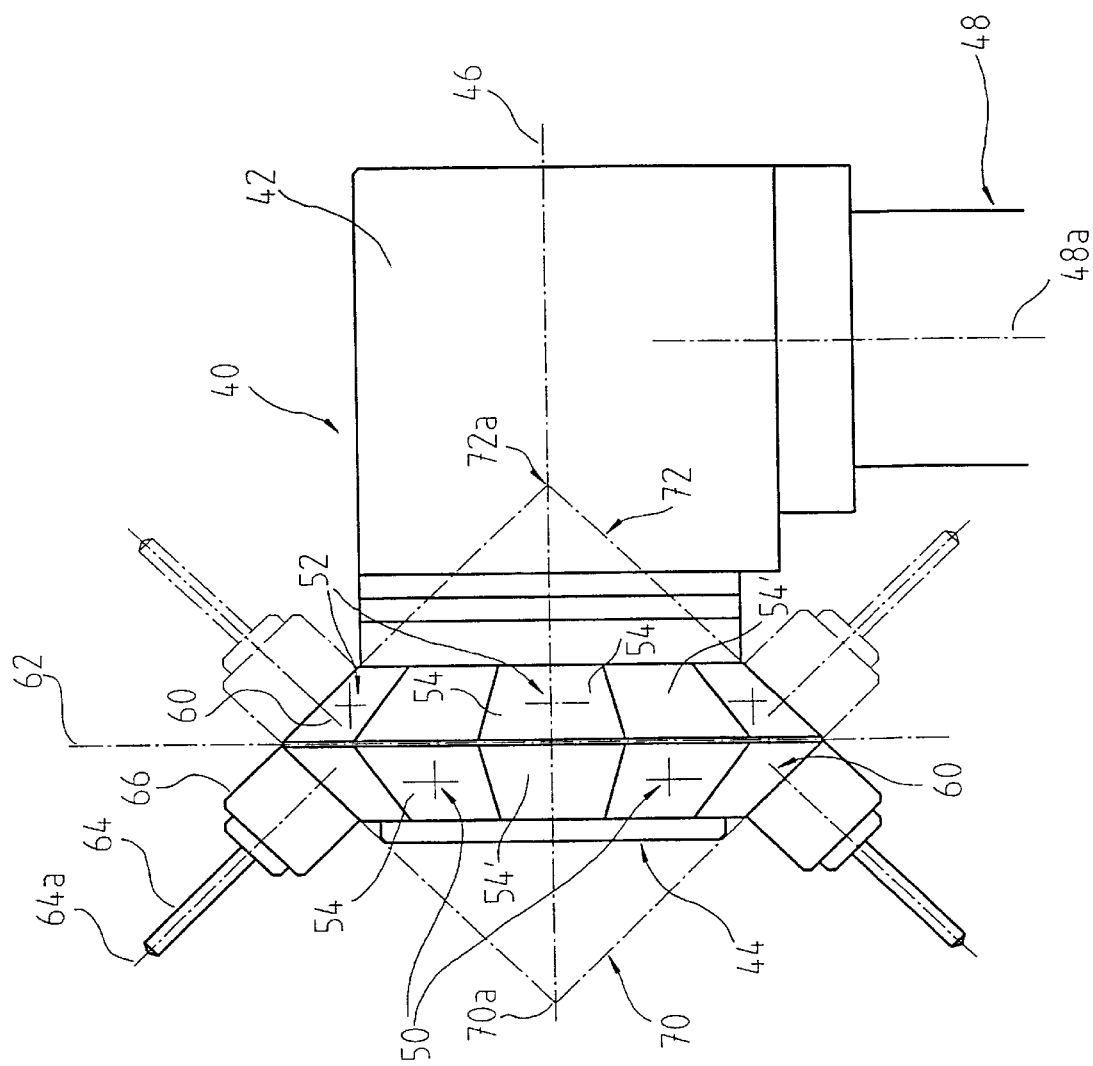

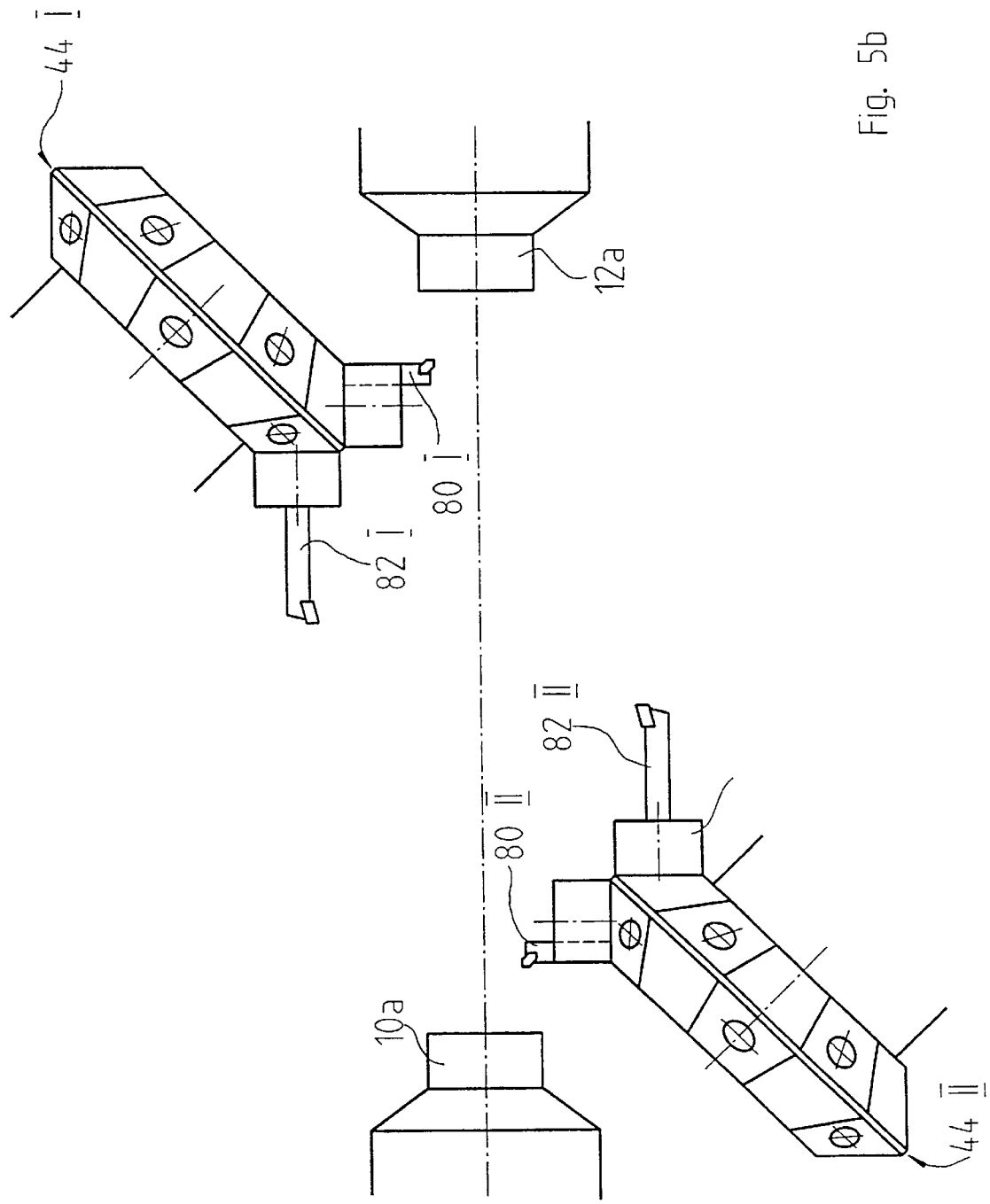

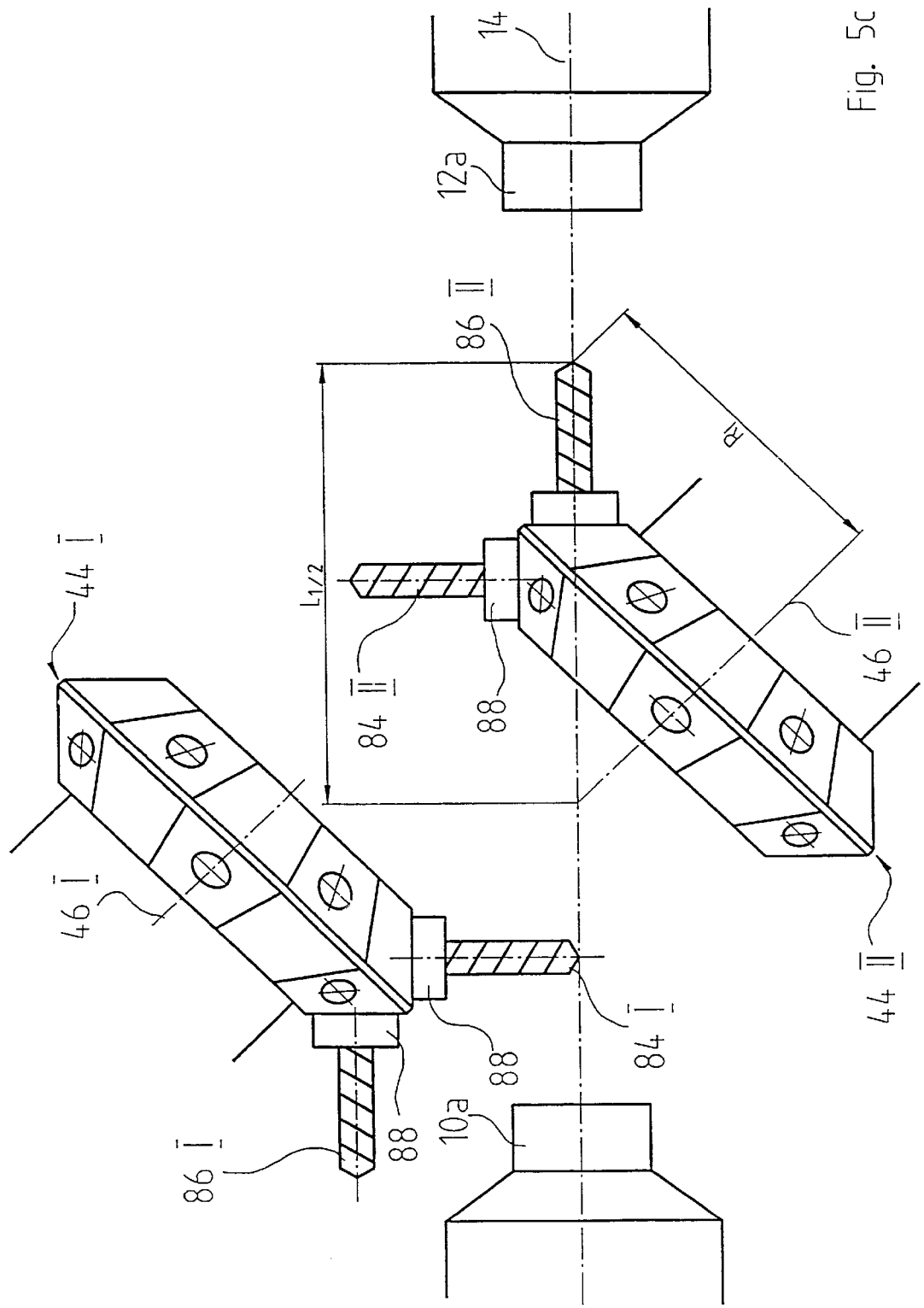

SECTION THROUGH COUPLING

TOOL DRIVE UNCOUPLED

TOOL LOCKED

SECTION THROUGH COUPLING

TOOL DRIVE COUPLED
TOOL UNLOCKED

TOOL TURRET FOR A MACHINE TOOL AND LATHE WITH SUCH A TOOL TURRET

The invention relates to a tool turret for a machine tool, in particular for lathes, and to lathes having at least one such tool turret.

Tool turrets have a turret head which can be equipped with several machining tools and a turret head carrying device, mostly referred to as turret housing, on or in which the turret head is mounted for rotation about a turret indexing axis and is lockable in several angular positions. The unlocked turret head can be rotated about the turret indexing axis by an indexing drive controlled by the machine tool control in order to bring a tool into working position, and the turret head is then locked again on the turret housing. Such a turret head has several tool stations, each of which has a tool receiving means for clamping an exchangeable toolholder for a machining tool. By turning the turret head about its indexing axis, all machining tools can be brought one after the other into working position in an optional sequence specified by the machine tool control and then put into operation. The invention does, however, also relate to tool turrets whose turret head is continuously rotatable about its indexing axis during the operation of a tool such as a milling cutter.

The machining tools may be tools which are stationary in relation to the turret head during the machining, for example, turning tools and drill rods, but also, as indicated above, tools which rotate about a tool axis during the workpiece machining, for example, drills, milling cutters, thread cutting tools and the like. In the case of the last-mentioned rotationally drivable tools, the actual tool is driven by a tool drive shaft rotatably mounted in the toolholder. When the toolholder is clamped in a tool receiving means of the turret head, the tool drive shaft extends into a cavity of the turret head and can be coupled to a drive shaft of a tool driving device of the tool turret. Non-driven tools, on the other hand, do not have an element for coupling with such a drive shaft of the tool driving device.

In most cases, the interface between tool and turret head is designed in accordance with a standard, for example, in accordance with German Industrial Standard 69880 or German Industrial Standard 69893, and this standard determines both the design of the toolholder and the design of the tool receiving means of the tool stations of the turret head.

Classic turret head shapes are the star turret, the disc turret and the crown turret. In the case of the star turret and the disc turret, the turret head has the shape of a disc which is perpendicular to and coaxial with the turret indexing axis and has the tool receiving means arranged at its circumference. In the star turret, the turret indexing axis extends perpendicularly to an axis of rotation of a workpiece spindle holding a workpiece to be machined, the said axis of rotation defining the direction of a Z-axis of the lathe, whereas in the disc turret the turret indexing axis extends parallel to the Z-axis. Consequently, for example, non-driven drills on a star turret extend in the radial direction in relation to the indexing axis thereof away from the turret head, on a disc turret, on the other hand, in the direction of its indexing axis. In crown turrets, the indexing axis extends at an incline to the direction of the Z-axis, in classic crown turrets the turret head has the shape of the frustum of a cone or a pyramid with the turret indexing axis as cone or pyramid axis and the tool receiving means for the toolholders arranged at its circumference, and a non-driven tool located in working position such as, for example, a drill, extends in the direction of the Z-axis and hence in a direction extending at an incline to the turret indexing axis away from the circumference of the turret head. In all three cases, the turret head can have at its circumference for each tool station a planar contact surface for the toolholder to be mounted there and a bore oriented perpendicularly to this contact surface for receiving a mostly cylindrical shaft of the toolholder extending from the contact surface into the turret head body.

From the above explanations of the three classic types of turret there follows that:

In the case of the star turret, the circular orbit (whose radius is usually referred to as maximum indexing radius) through which the tip of the longest tool passes during rotation of the turret head has a very large diameter, which results in a considerable overall length of the lathe equipped with such a star turret. This has a negative effect, in particular, on the overall length of so-called opposed spindle lathes (lathes with two coaxial workpiece spindles arranged opposite each other with workpiece clamping devices facing one another). Furthermore, the tools carried by a star turret are turned and/or bent about the axis of the respective tool receiving means by the forces acting on the tools during the machining, which results in inaccuracies in the geometry of the machined workpieces.

The last-mentioned disadvantage also occurs in disc turrets: A so-called inside machining tool such as a drill or a drill rod tends to be turned in the tool receiving means under the influence of the forces acting on the tool during the machining as a disc turret requires long protruding tools in the direction of the Z-axis, and, therefore, large torques act on the tool during the machining and attempt to urge the tool out of its specified position. Also, for machining the end face of a workpiece with a driven tool such as a rotating drill, a disc turret requires a toolholder which includes a costly angular gearing for the tool drive. Finally, such toolholders must be precisely aligned with great expenditure.

A crown turret has an advantageously small maximum indexing radius, but, similarly to the star turret, so-called outside machining tools, i.e., for example, a turning tool for reducing the outer diameter of a workpiece, tend under the machining forces to be turned about the axis of their tool receiving means. Furthermore, driven tools whose toolholders include a complicated angular gearing must be used for drilling and milling work at the circumferential surface of a workpiece. Finally, a crown turret can only be used on an opposed spindle lathe if considerable disadvantages are accepted—angled and, therefore, complicated toolholders are required, and problematic lever relations at the machining tool which permit only low cutting forces must be tolerated.

The object underlying the invention was to develop a tool turret so as to allow the geometry of the working area of a machine tool to be designed as expediently as possible and to simultaneously permit all conceivable machining operations which are to be performed today on a lathe to be carried out with the least possible expenditure and the shortest possible retooling times.

A lathe comprising a workpiece spindle which is mounted in a headstock for rotation about a spindle axis defining the direction of a Z-axis of the lathe, and at whose end facing the working area of the lathe a workpiece clamping device is mounted for holding a workpiece to be machined, is known from the publication "INDEX G30/150NC" of Index-Werke GmbH & Co. KG Hahn & Tessky. A compound slide system carried by a machine bed of the lathe carries a tool turret which owing to the compound slide system is displaceable in the direction of the Z-axis and an X-axis of the lathe perpendicular thereto and has a turret head which is rotatable about a turret indexing axis extending at an incline to the direction of the Z-axis. The shape of this turret head corresponds approximately to the shape of two truncated cones lying against one another at their bases and having different cone angles. The circumferential areas of the truncated cones each have a row of tool stations which are equidistant with respect to angle of rotation and each of which has a tool receiving means for clamping a toolholder for a machining tool. Seen in the direction of the turret indexing axis, the tool stations of the one row lie in the spaces between the tool stations of the other row, and the tool stations of the row facing away from the compound slide system each have a planar contact surface formed by the outer surface of the turret head for a toolholder of an outside machining tool and a bore perpendicular to this contact surface for receiving a shaft of this toolholder, while the row of tool stations facing the compound slide system has dovetail-shaped tool receiving means for clamping toolholders of inside machining tools. This known tool turret does not have a tool driving device and can, therefore, only be equipped with tools which are stationary in relation to the turret head during the machining.

In order to accomplish the set object, the basic shape of the body of the above-described known turret head which tapers on either side of a diameter plane of the turret head body extending perpendicularly to the turret indexing axis was adopted.

The invention, therefore, departs from a tool turret for a machine tool comprising a turret head mounted on a turret head carrying device of the tool turret for rotation about a turret indexing axis and lockable by a turret head locking device relative to the carrying device in a specified number of indexing positions which are equidistant with respect to angle of rotation in relation to the indexing axis, the turret head tapering on either side of a diameter plane of the turret head extending perpendicularly to the turret indexing axis and having on each side of this diameter plane a circular ring-shaped row, concentric with the indexing axis, of tool stations which are equidistant with respect to angle of rotation, each of the tool stations having a tool receiving means associated with one of the indexing positions for clamping a toolholder for a machining tool.

In order to accomplish the stated object, such a tool turret is designed in accordance with the invention such that:

(a) at least two of the tool receiving means are designed for clamping a tool rotatably drivable about a tool axis, the toolholder of the said tool having a tool drive shaft for engaging the respective tool receiving means, and a tool driving device is provided for the tool drive shafts;

(b) each tool station has as part of an interface between toolholder and turret head a planar contact surface formed by the outer surfaces of the turret head for the respective toolholder;

(c) the contact surfaces of a first row of tool stations define a first, in particular, regular pyramid, and the contact surfaces of the other, second row of tool stations a second, in particular, regular pyramid, both pyramids having preferably the same shape and apexes pointing away from one another, and the axis of each pyramid coinciding with the turret indexing axis so that the two pyramids adjoin one another at the diameter plane of the turret head, the pyramid apexes being equidistantly spaced from the diameter plane;

(d) each row of tool stations has at least one tool receiving means for a drivable tool;

(e) each of the tool receiving means for driven tools has an axis extending perpendicularly to the contact surface of the respective tool station;

(f) two adjacent tool receiving means for drivable tools belong to different rows of tool stations and are offset from one another with respect to angle of rotation in relation to the turret indexing axis, the axes of these tool receiving means penetrating the diameter plane of the turret head at points which lie on a circle concentric with the indexing axis;

(g) the tool driving device has at least one drive shaft extending perpendicularly to the turret indexing axis, the drive shaft being displaceable in the longitudinal direction thereof for coupling with and uncoupling from a tool drive shaft of a drivable tool.

As will be apparent from the following, the inventive tool turret not only accomplishes the set object but offers at the interfaces between toolholder and turret head for each toolholder a relatively large planar contact and support surface owing to the "double pyramid", and, in addition, creates the possibility of arranging all tools such that for each tool in operation, the risk is minimized that the tool will be bent under the influence of the machining forces or its toolholder will be turned in the tool receiving means, and, more specifically, also when the toolholders have cylindrical shafts for insertion into bores of the tool receiving means. As far as the maximum indexing radius is concerned, an inventive tool turret is just as advantageous as a crown turret. Furthermore, the inventive tool turret can be readily designed such that of the drivable tools, always only that tool which is in working position at that time is driven, which minimizes the energy losses occurring in the turret head and creates the possibility of securing all drivable tools not in working position against rotation—certain drivable tools are advantageously put into operation in a specific angle of rotation position. Finally, with use of an inventive tool turret, angular gearings can be completely avoided in the toolholders of driven tools.

Various designs are conceivable for the drive connection between the drive shaft of the tool driving device and the tool drive shaft of a drivable tool located in working position. However, an embodiment is preferred wherein the drive shaft of the tool driving device is provided at its end region facing away from the turret indexing axis with a toothed gear in the form of a bevel gear for coupling with a toothed gear on the tool drive shaft of a drivable tool located in working position. The toothed gear of the tool drive shaft could equally well be a bevel gear, but the inventive construction allows use of a less complicated spur gear at this location instead of a bevel gear.

A special feature of a preferred embodiment of the inventive tool turret is that the axes of the tool receiving means for driven tools are arranged such that upon rotation of the turret head about its indexing axis, axes of the tool receiving means or axes of the tool drive shafts moving one after the other past the toothed gear of the drive shaft of the tool driving device pass this toothed gear alternately on its one and its other side. The axes of the tool receiving means or of the tool drive shafts which are at an incline to the above-mentioned diameter plane of the turret head thus intersect radially outside the drive shaft of the tool driving device if one imagines the rows of tool stations stretched out to straight rows and views them in the longitudinal direction of these stretched out rows. Owing to the fact that all contact surfaces of the tool stations and all axes of the tool receiving means form an angle of the same size with the said diameter plane of the turret head and with the turret indexing axis, respectively, the angle of engagement at the bevel gear of the drive shaft of the tool driving device is the same for the gears of all tool drive shafts.

To drive the drive shaft of the tool driving device or, if the latter should have several drive shafts, all drive shafts of the tool driving device, by means of a central input shaft, but also to be able to displace these in the radial direction in relation to the turret indexing axis, a construction is recommended wherein the drive shaft of the tool driving device is provided at its circumference with a spur gear toothing for driving the drive shaft by means of a crown gear toothing of an input shaft coaxial with the turret indexing axis. This has the further advantage that the drive shaft or all drive shafts can always be coupled with the input shaft and, therefore, during uncoupling of the driven tools, the machine control does not lose control of the angle of rotation position of the drive shaft of the tool driving device—as mentioned above, provision is made in preferred embodiments of the invention for the tool shafts to be blocked when uncoupling a drivable tool so that also the angle of rotation positions of the tools themselves always pertain to the data present in the machine control.

Since, in preferred embodiments of the inventive tool turret, the tool receiving means for drivable tools are to be designed such that they can also be equipped with non-drivable tools, embodiments are preferred wherein each row of tool stations has several tool receiving means for drivable tools, and, in particular, all tool receiving means are designed for receiving drivable tools. In this connection, however, reference is already made at this point to the following explanations from which it will be apparent that in this case, too, additional tool receiving means for non-drivable tools can be provided between the tool receiving means of each row of tool stations.

Above all, for use on machine tools which do not have a so-called B-axis for the tool turret, the contact surfaces of the tool stations or the axes of the tool receiving means should each form an angle of 45° with the diameter plane of the turret head, which is equivalent to the side surfaces of each pyramid each forming an angle of 45° with the turret indexing axis, as tools of a tool turret can then be used at each of the two workpiece spindles in an opposed spindle lathe, too. However, if the tool turret is pivotable about a B-axis, i.e., about an axis extending perpendicularly to the Z-axis and to the X-axis, an angle of 45° is not absolutely necessary.

It follows from the above explanations that the invention also relates to a lathe with a B-axis for the tool turret and/or with two opposed, coaxial workpiece spindles, i.e., a so-called opposed spindle lathe, with one or several inventive tool turrets.

Figure 2:
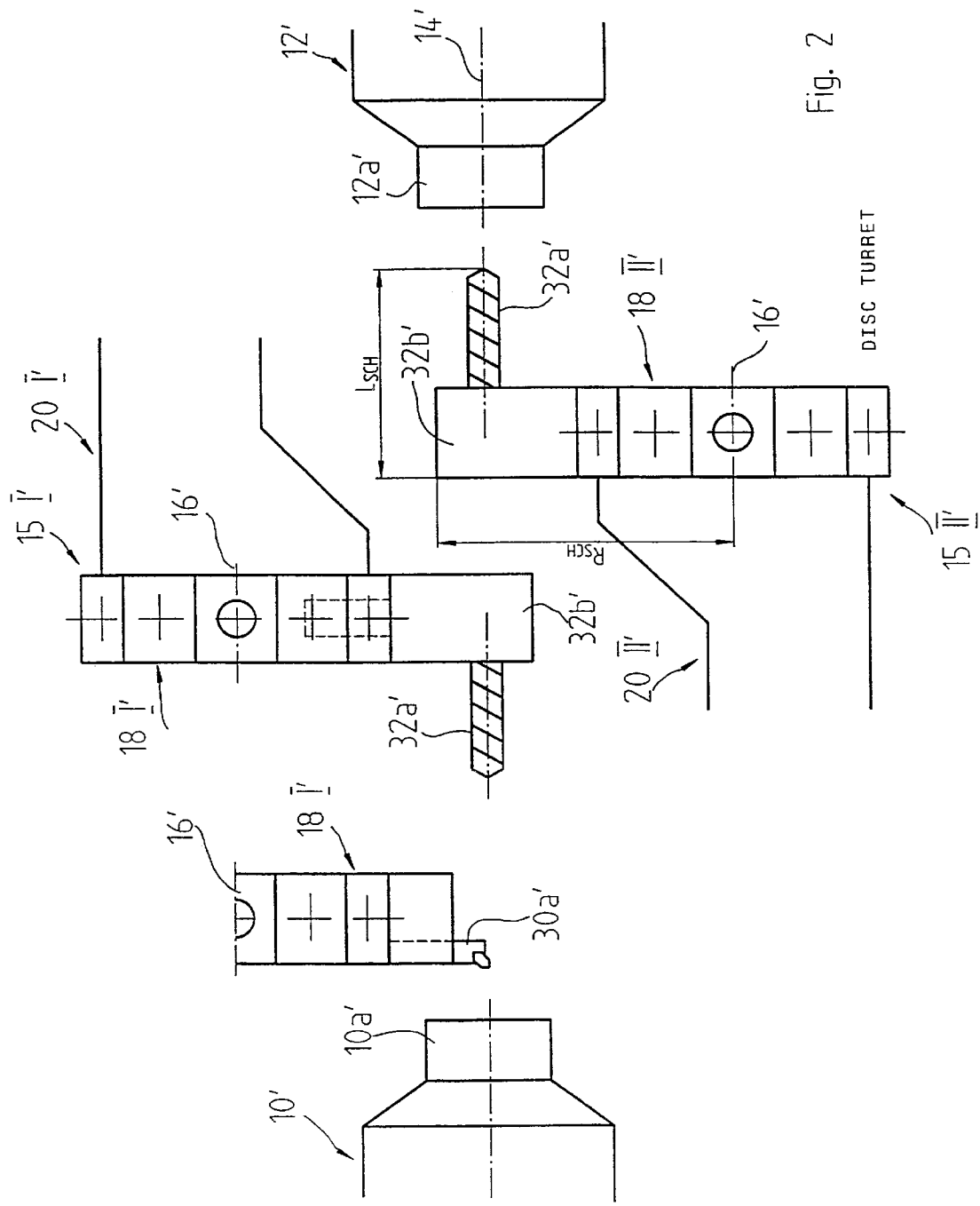
Figure 4B:
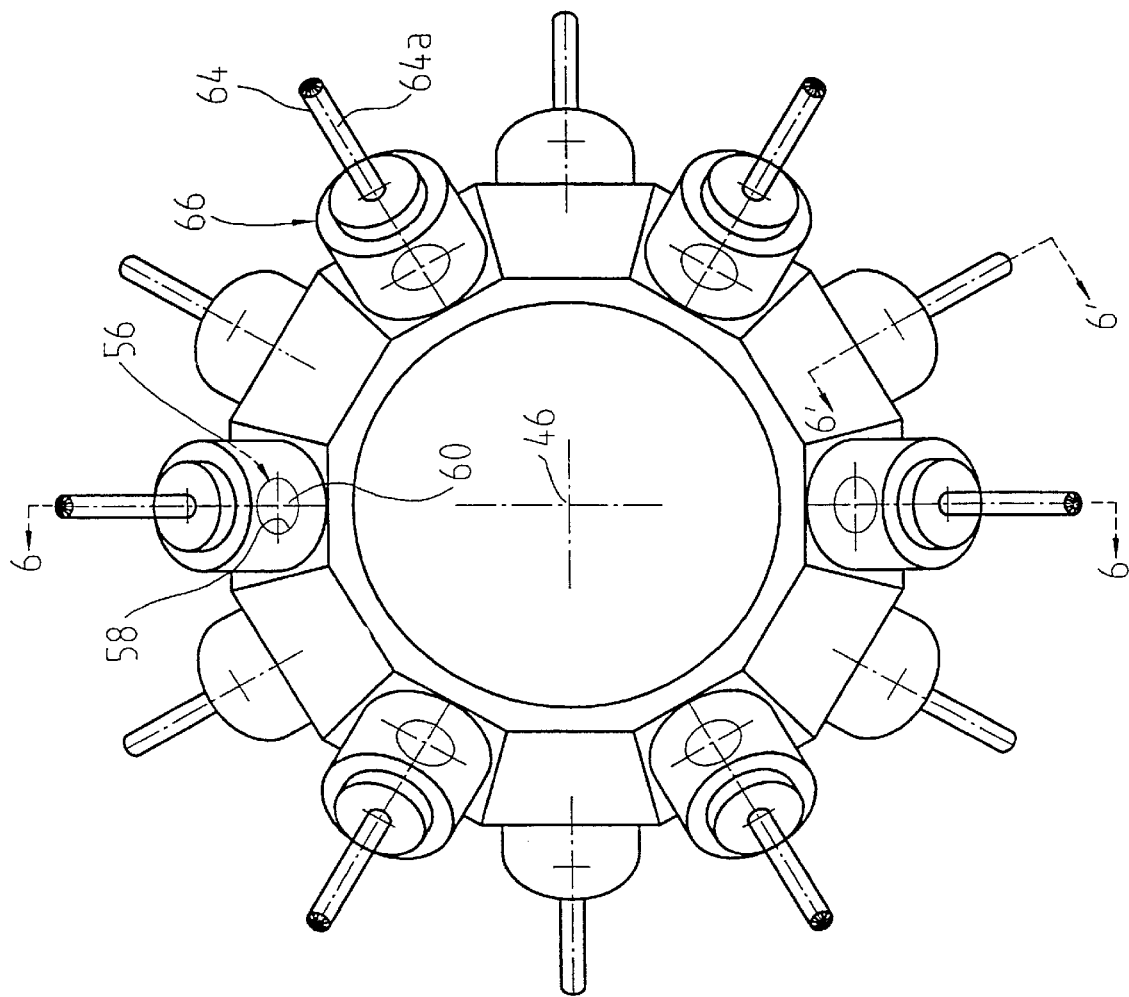
Figure 5A:
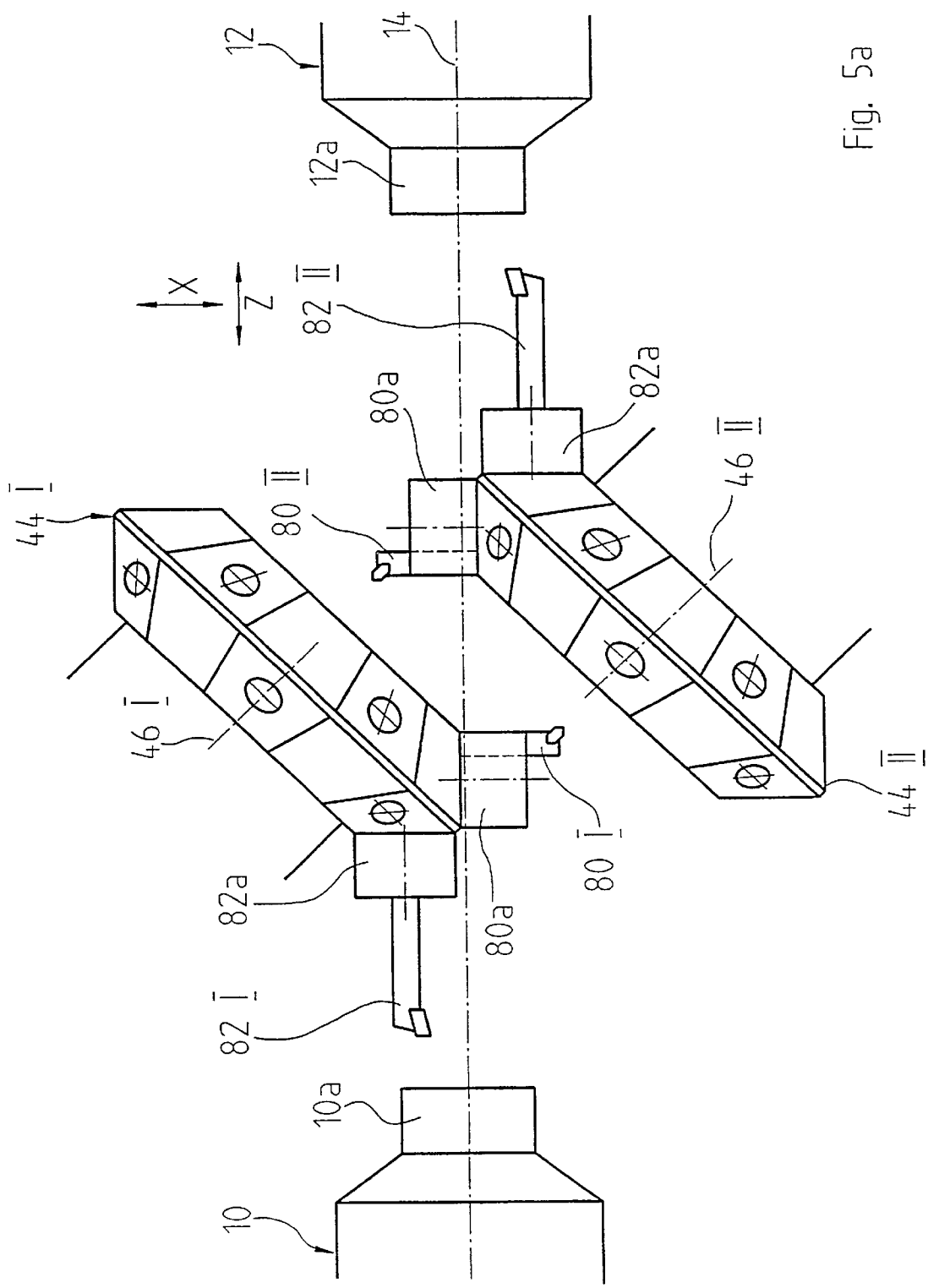
Figure 6:
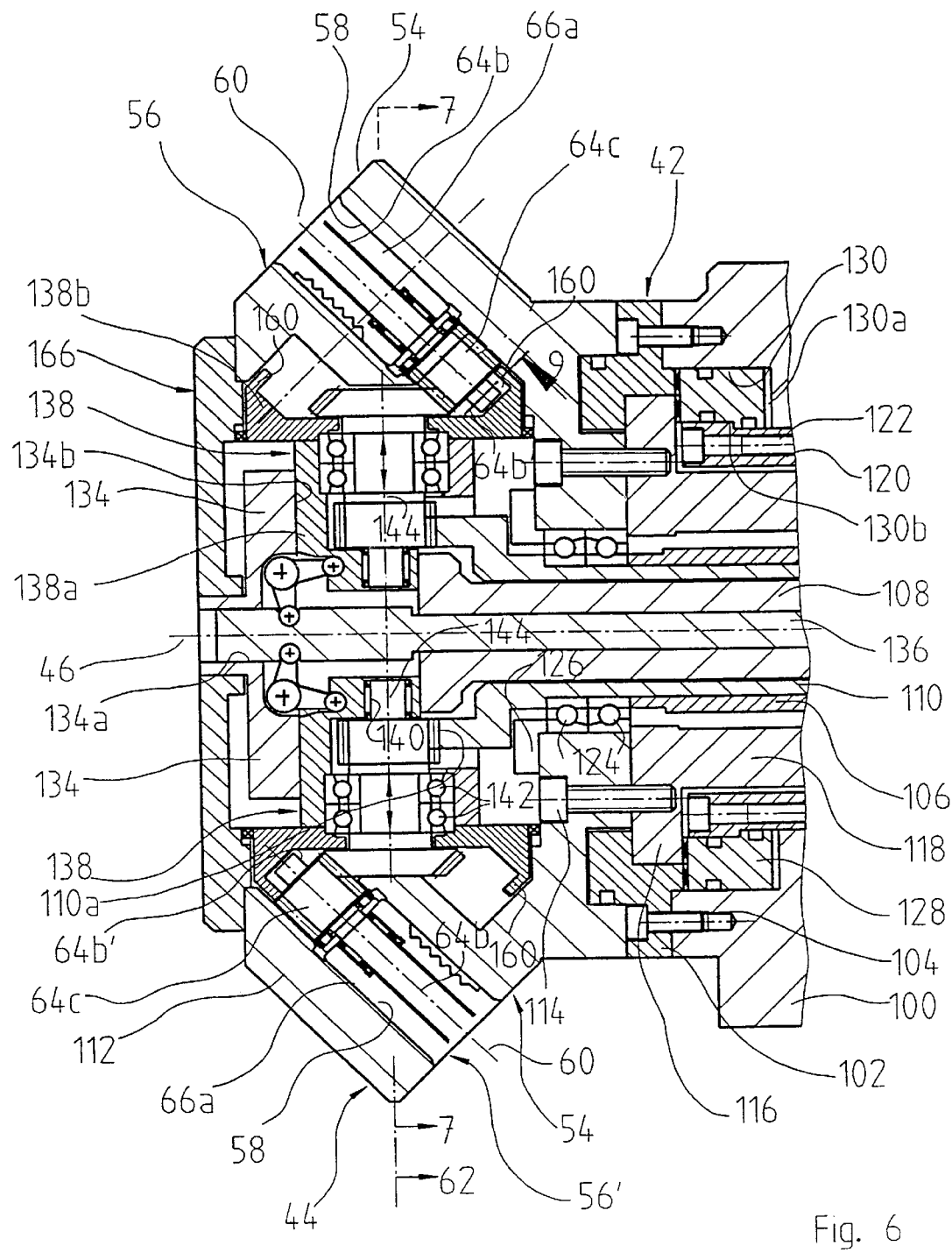
Figure 7:
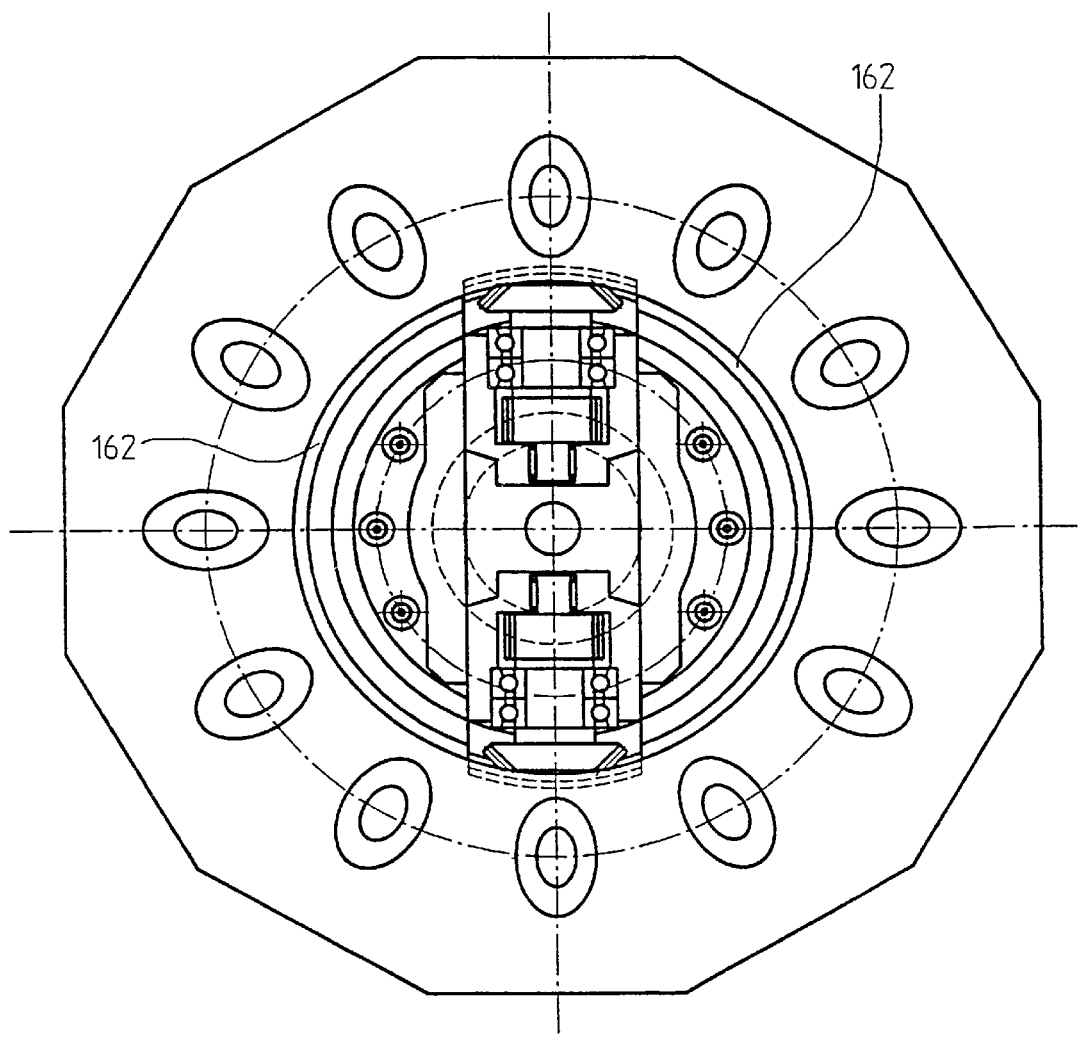
Figure 8:
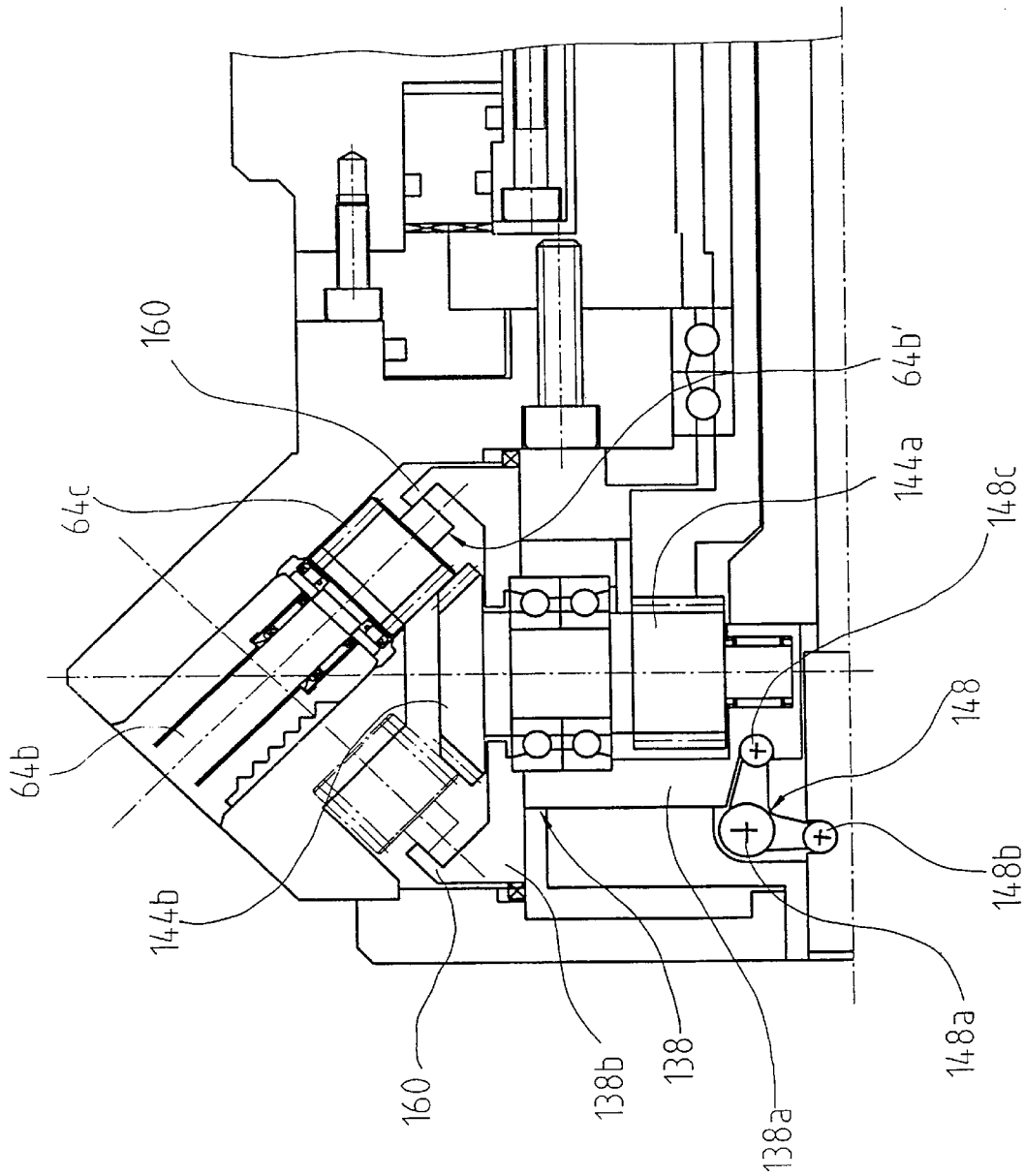
Figure 9A:
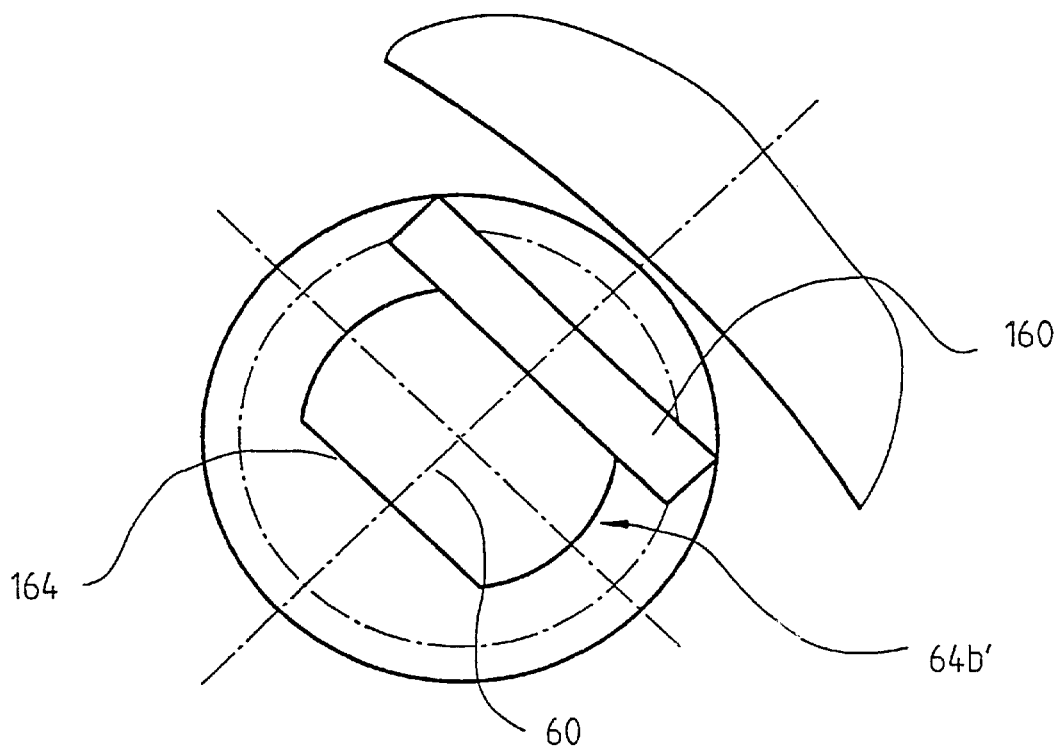
Figure 9B:
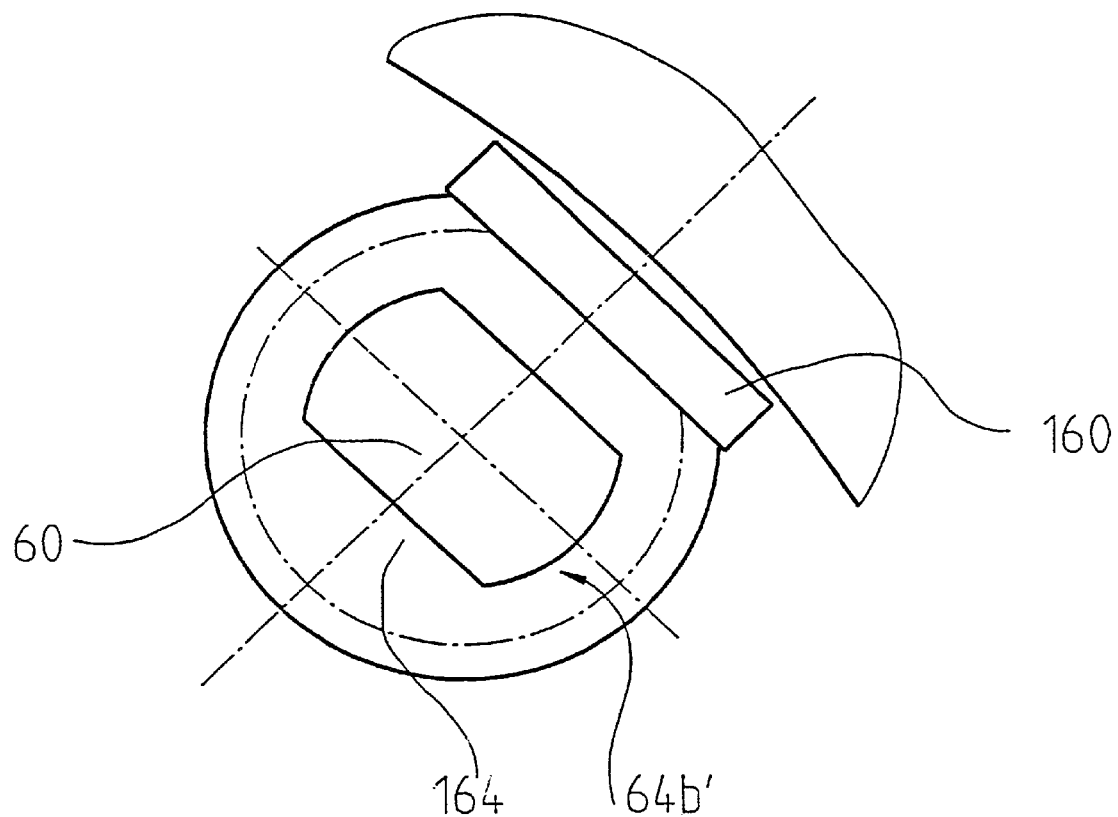
Figure 10:
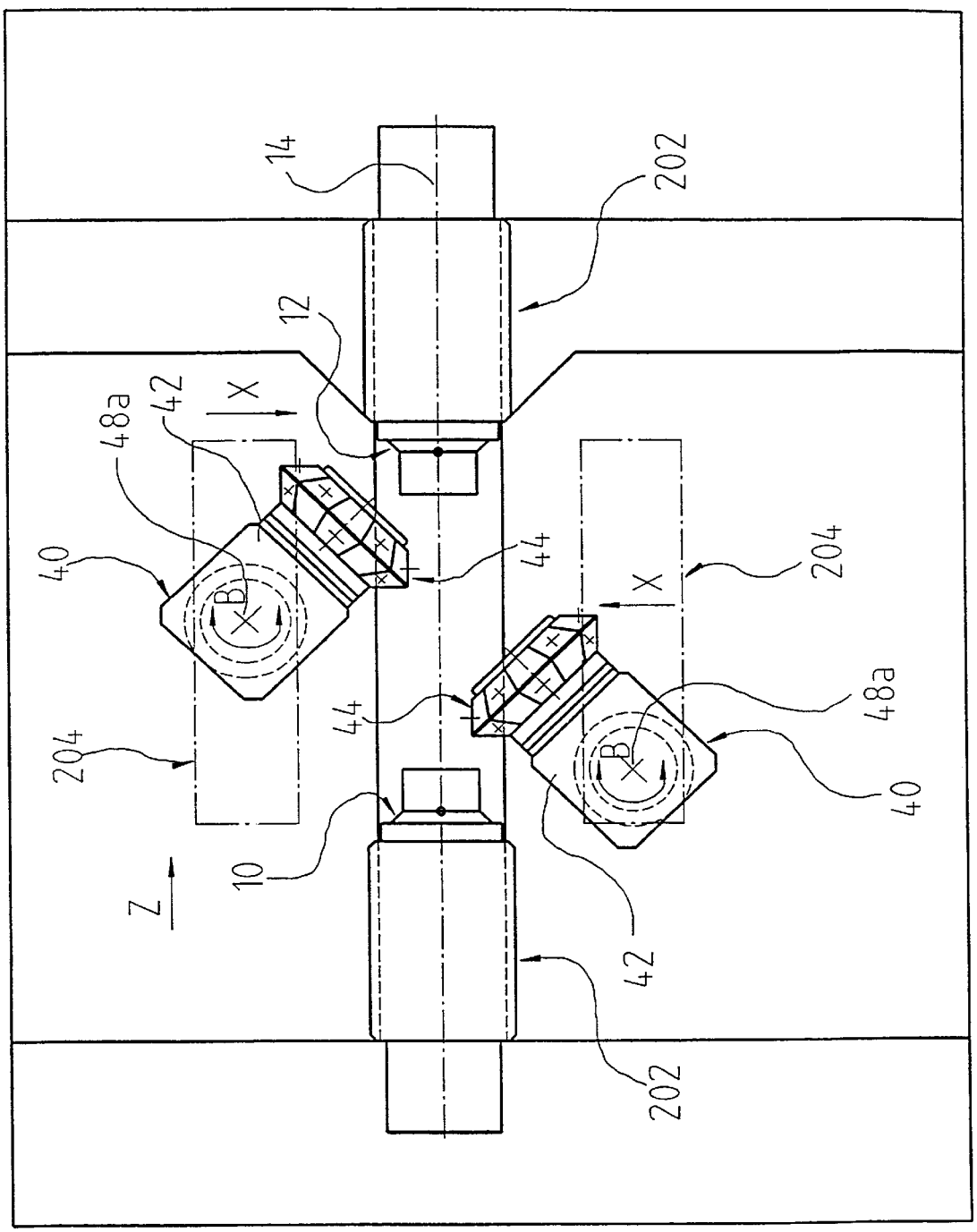
Figure 11:
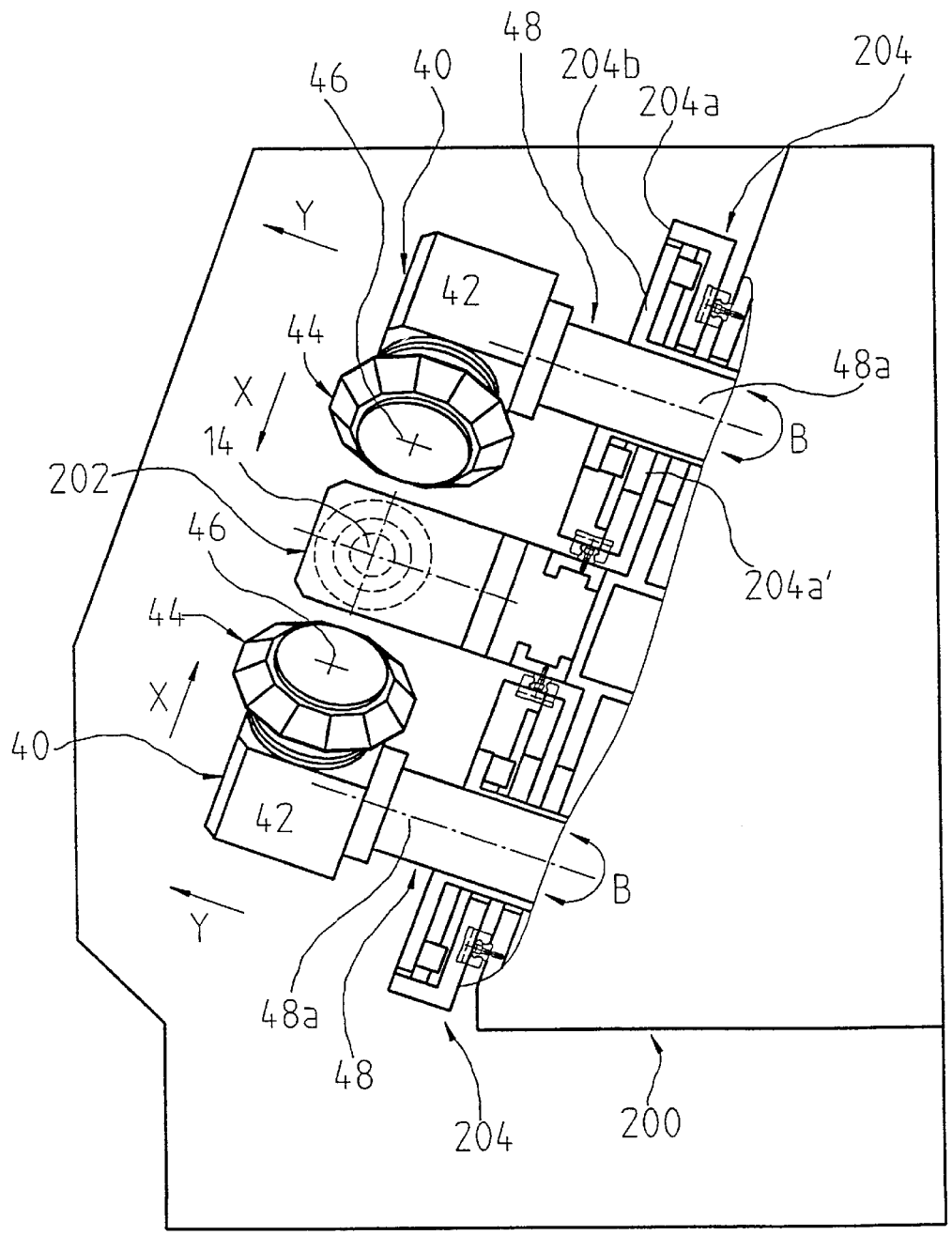
Figure 12:
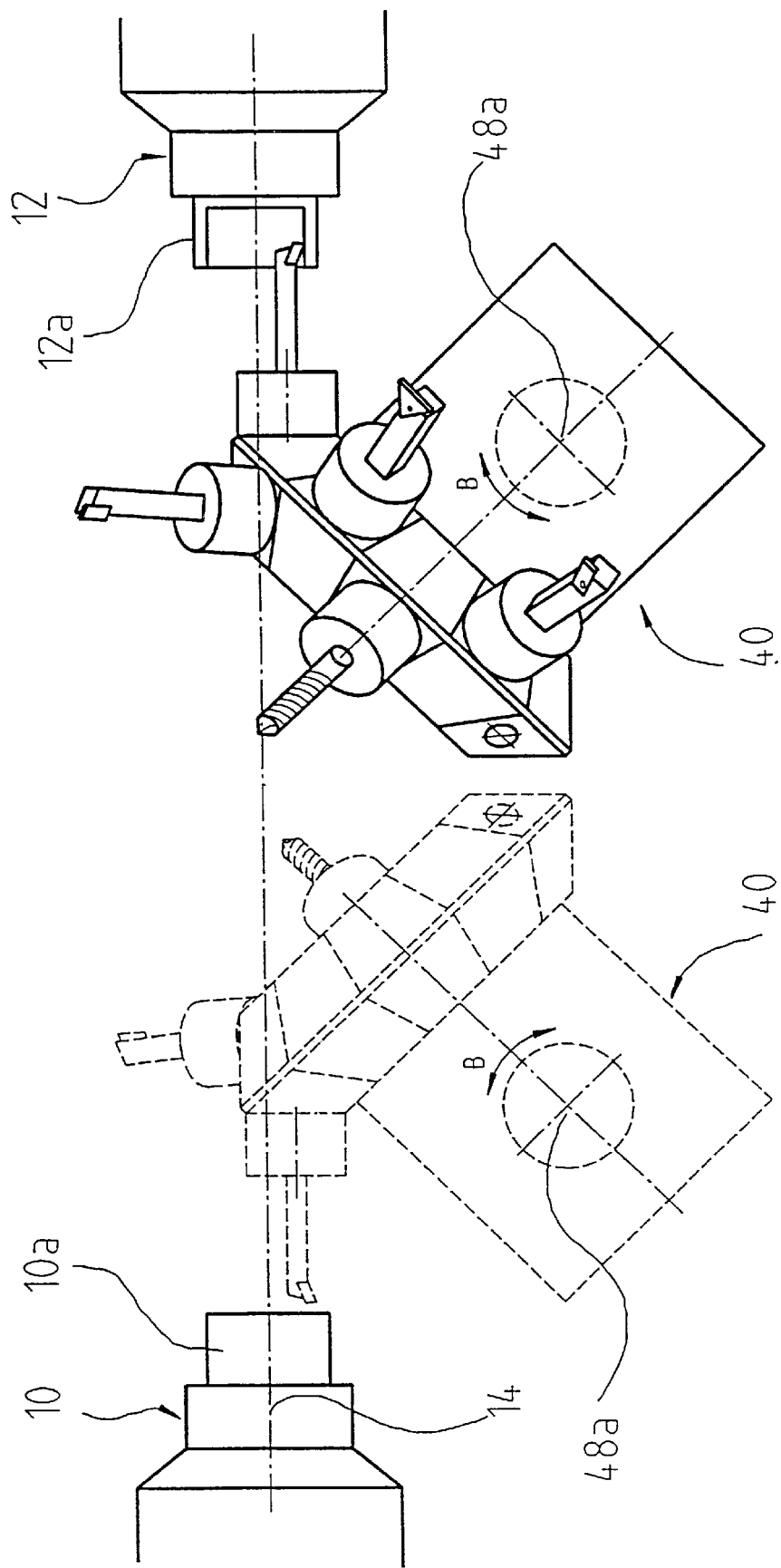

The invention will now be explained in greater detail with reference to particularly advantageous embodiments shown in the drawings, and additional features and advantages of the invention will be apparent from the drawings and the description thereof. The drawings show:

FIG. 1 a schematic and highly simplified plan view of the working area of a lathe designed as an opposed spindle lathe with a conventional star turret;

FIG. 2 an illustration corresponding to FIG. 1, but with conventional disc turrets;

FIG. 3 a schematic and again highly simplified view of the working area of a lathe with a workpiece spindle and a conventional crown turret, but which was drawn in two positions, wherein in the one position an inside machining tool in the form of a drill is located in working position, while in the other position an outside machining tool in the form of a turning tool is located in working position;

FIG. 4a a schematic side view of an inventive tool turret with a tool turret carrier in the form of a column to implement a B-axis and a Y-axis for the tool turret;

FIG. 4b an end view (seen from the left in FIG. 4A) of the inventive tool turret, but in contrast with FIG. 4A all tool receiving means for drivable tools are equipped with such tools;

FIGS. 5a, 5b and 5c illustrations corresponding to FIG. 1 of an opposed spindle lathe, but having two inventive tool turrets which in FIGS. 5a and 5b are equipped with non-drivable tools in the form of inside and outside machining tools, and in FIG. 5c with drills for longitudinal and transverse drilling, with FIGS. 5a and 5b showing the two tool turrets in different positions in order to illustrate that each tool turret can be used at each workpiece spindle;

FIG. 6 an axial section through a preferred embodiment of the inventive tool turret, more specifically, a section taken on line 6—6 in FIG. 4b, but with the tool receiving means shown at the bottom in FIG. 6 together with the tool drive shaft of the drivable tool inserted into this receiving means drawn in a different sectional plane corresponding to line 6'—6' from FIG. 4b;

FIG. 7 a section taken on line 7—7 in FIG. 6, but with the tool drive shafts omitted;

FIG. 8 the upper left part of FIG. 6 on a larger scale, but with the tool driving device uncoupled from the tool drive shaft shown at the top of FIG. 6;

FIGS. 9a and 9b sections taken on sectional line 9 indicated in FIG. 6, but on a larger scale, with the tool drive shaft shown at the top of FIG. 6 uncoupled and locked in FIG. 9a, while FIG. 9b shows that state in which this tool drive shaft is coupled with the tool driving device and can be driven;

FIG. 10 a plan view of an opposed spindle lathe with two inventive tool turrets according to FIG. 4a;

FIG. 11 a view of the left workpiece spindle according to FIG. 10 and of the two tool turrets together with their tool turret carriers and compound slide systems, seen from the right in FIG. 10; and FIG. 12 an illustration corresponding to FIG. 10, but wherein only the lower tool turret of FIG. 10 is drawn, more specifically, in two different positions in order to illustrate that both workpieces held by the one workpiece spindle and workpieces held by the other workpiece spindle can be machined with all tools of this tool turret.

The elements shown in FIG. 1 of a conventional lathe designed as an opposed spindle lathe and equipped with a known star turret are a workpiece spindle 10 for holding a workpiece 10a to be machined, a workpiece spindle 12 for holding a workpiece 12a to be machined, which are both mounted for rotation about a spindle axis 14 common to the two spindles, and a tool turret 15 with a turret head 18 rotatable about a turret indexing axis 16 and a turret housing 20 acting as a turret head carrying device and having the turret head 18 mounted thereon. The turret head 18 of the tool turret 15 designed as star turret has twelve tool stations, each of which has a tool receiving means 22 which is provided with a receiving bore 24 (FIG. 1 shows only one of these receiving bores) with an axis 26 extending radially in relation to the indexing axis 16. Associated with the tool receiving means 22 is a planar contact surface 28 formed by the circumferential surface of the turret head 18 and extending perpendicularly to the axis 26. The tool receiving means 22 can be equipped with machining tools, each consisting of the actual tool and a toolholder. FIG. 1 shows only two such machining tools, namely an outside machining tool 30a in the form of a turning tool and an inside machining tool 32a in the form of a drill. The outside machining tool 30a is held by a toolholder 30b, the inside machining tool 32a by a toolholder 32b, and each of these toolholders has a cylindrical toolholder shaft 30c and 32c, respectively, which is inserted into the receiving bore 24 of the respective tool receiving means 22 and is clamped by means, not shown, in this receiving bore.

The directions of the Z-axis and the X-axis of this lathe are also indicated in FIG. 1 by the double arrows Z and X. The Z-axis runs parallel to the spindle axis 14, the X-axis perpendicularly to the Z-axis, more specifically, in such a direction that by displacement of the tool turret 15 in the direction of the X-axis, the diameter of the workpiece 10a and 12a, respectively, is adjustable, and this diameter is obtained by machining the outer circumference of this workpiece with the outside machining tool 30a.

The headstocks in which the workpiece spindles 10 and 12 are mounted are not shown. Also not shown is the compound slide system which carries the tool turret 15 and by means of which the tool turret 15 is displaceable in the direction of the Z-axis and the X-axis relative to the two workpiece spindles 10 and 12.

The tool whose tip has the largest radial spacing from the turret indexing axis 16, i.e., in the case of FIG. 1 the inside machining tool 32a, determines the so-called maximum indexing radius $R_{ST}$ of the tool turret 15, and in a star turret this maximum indexing radius is equal to half of the necessary maximum indexing length in the direction of the Z-axis between the two workpiece spindles which is required in order to be able to turn the turret head 18 equipped with machining tools through 360° without one of its tools colliding with one of the workpiece spindles or with one of the workpieces.

As will be clearly apparent from FIG. 1, for example, during machining of the circumference of the workpiece 12a with the outside machining tool 30a, the machining force s acting upon the outside machining tool 30a have the tendency to turn the toolholder 30b about the axis of its shaft 30c, i.e., about the axis 26 of the tool receiving means 22 holding the toolholder 30b.

In FIG. 2, which shows an opposed spindle lathe with a conventional disc turret in a manner corresponding to FIG. 1, the same reference numerals were used as in FIG. 1, but with the addition of a prime, and since the lathes shown in FIGS. 1 and 2 differ only in the type and arrangement of the turret and, consequently, in the design of the toolholders, the explanation of FIG. 2 can be kept short.

The opposed spindle lathe shown in FIG. 2 is provided with two tool turrets 15I' and 15II' in the form of disc turrets, with the tool turret 15I' associated with the workpiece spindle 10' and the tool turret 15II' associated with the workpiece spindle 12', at any rate, when this lathe is not provided with B-axes for the two tool turrets. The turret heads 18I' and 18II' shown fully in FIG. 2 each carry an inside machining tool 32a' in the form of a drill (the other tools are not shown), however, one half of the turret head 18I' is also shown together with an outside machining tool 30a'. As will be apparent from the maximum indexing radius $R_{SCH}$ drawn for the tool turret 15II', this is considerably smaller for a disc turret than for a star turret, as the inside machining tools do not protrude from the turret head in the radial direction in relation to the turret indexing axis in the disc turret, but in a disc turret the toolholders 32b' for driven inside machining tools must include a complicated angular gearing since drive shafts located in the interior of the turret head for driving drills and the like extend in the radial direction in relation to the turret indexing axis. Like the maximum indexing radius, the maximum indexing length $L_{SCH}$, which is drawn for tool turret 18II' in FIG. 2, is also considerably smaller in a disc turret than in a star turret.

Figure 3:
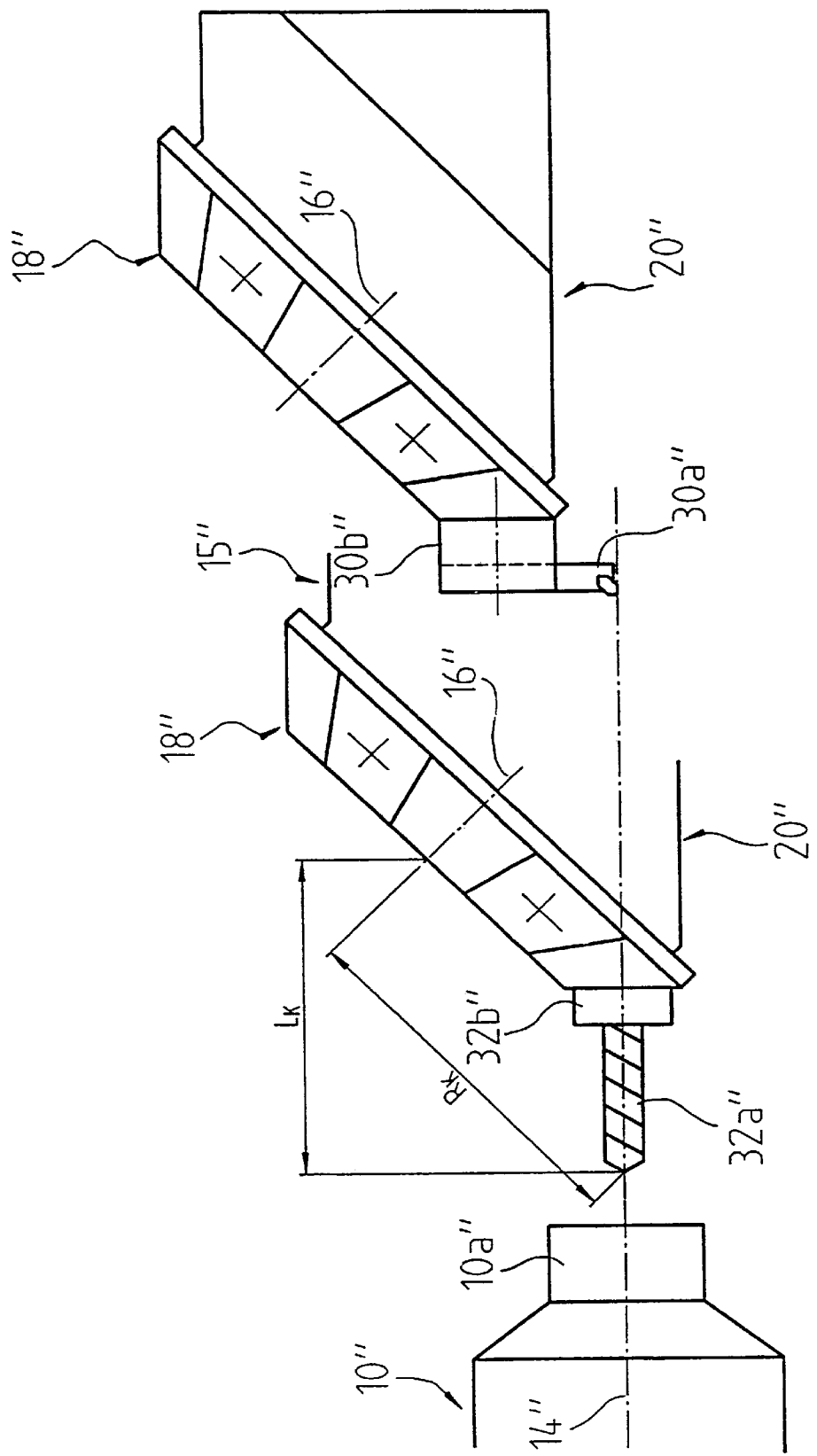

In FIG. 3, which illustrates a lathe with a conventional crown turret in analogy with FIG. 1, the same reference numerals are used as in FIG. 1, but with the addition of a double prime, and, therefore, the description of FIG. 3 can also be kept short.

FIG. 3 shows one and the same tool turret 15" in the form of a conventional crown turret in two different positions, wherein, in the one position an inside machining tool 32a" is located in working position, and in the other position an outside machining tool 30a" is located in working position.

As will be apparent from FIG. 3, a crown turret has a particularly small maximum indexing radius $R_K$ and a particularly small maximum indexing length $L_K$. The toolholders 32b" for inside machining tools 32a" have owing to their inclined arrangement in relation to the turret head 18" a larger planar and, therefore, stabile contact surface, but outside machining tools 30a" tend, like with a star turret shown in FIG. 1, under the influence of the machining forces, to be turned about the axis of their tool receiving means. Furthermore, driven tools which, differently from the inside machining tool 32a" shown in the drawing, are to be applied to a circumferential surface of a workpiece, require an angular gearing in their toolholder. Finally, the tools of a crown turret can always only be used at one workpiece spindle unless the lathe is provided with a B-axis for the crown turret.

FIGS. 4a and 4b show a side view and an end view, respectively, of an inventive tool turret. As will be apparent from FIG. 4a, the tool turret designated in its entirety 40 is provided with a turret housing 42 acting as a turret head carrying device and with a turret head 44 mounted on or in the turret housing 42 for rotation about a turret indexing axis 46. The turret head 44 can be turned by a turret indexing device, not shown, about the indexing axis 46 and fixed by a locking device, also not shown, on the turret housing 42. Since such indexing devices are known in principle and those skilled in the art are familiar with these, reference may be made, in this connection, to the prior art, whereas the locking device will be described hereinbelow.

In the embodiment shown in FIG. 4a, the turret housing 42 is carried by a column 48 serving as tool turret carrier and having an axis designated 48a. This column is to be arranged on a compound slide system of the machine tool so as to allow the column 48 to be displaceable in the direction of the Z-axis and in the direction of the X-axis. Furthermore, the column 48 is to be mounted on the top slide of this compound slide system carrying the column in such a way that it is displaceable in the direction of the column axis 48a and rotatable about this axis in relation to this top slide. As the column axis 48a is to extend perpendicularly to the direction of the Z-axis and perpendicularly to the direction of the X-axis, the column axis 48a thus defines the direction of a so-called Y-axis of the machine tool in which the tool turret 40 is displaceable, but also the direction of a so-called B-axis of the machine tool about which the tool turret 40 is pivotable.

The turret head 44 has a first, front row of six tool stations 50 and a second, rear row of six tool stations 52 which are to be of the same design as the tool stations of the star turret shown in FIG. 1 and are to be arranged in relation to the turret indexing axis 46 in the same way as the tool stations of the crown turret shown in FIG. 3. Each tool station is thus provided with a planar contact surface 54 and a tool receiving means 56, indicated in FIG. 4b, with a receiving bore 58 (see also FIG. 4b), the axes of these receiving bores being designated 60. Each of these axes 60 extends perpendicularly to the associated contact surface 54 and forms, in preferred embodiments of the inventive tool turret, an angle of 45° with a center plane 62 of the turret head 44 and, therefore, in such an embodiment also each of the contact surfaces 54 forms an angle of 45° with the center plane 62. Furthermore, all axes 60 penetrate the center plane at points which lie on a circle concentric with the indexing axis 46.

In the preferred embodiment, all tool stations 50 and all tool stations 52 are to be provided and, consequently, are appropriately designed for driven tools. The tools themselves are designated 64, their axes 64*a* and their toolholders 66. As in the construction shown in FIG. 1, each of these toolholders is to comprise a cylindrical toolholder shaft, not shown in FIGS. 4*a* and 4*b*, which engages the receiving bore 58 of the respective tool receiving means 56, while a rear and planar end face of the toolholder 66 used by the actual tool 64 rests against the contact surface 54 of the respective tool station 50 and 52, respectively.

As will be particularly apparent from FIG. 4*b*, both the tool stations 50 of the one row and the tool stations 52 of the other row—seen in the direction of the turret indexing axis 46—are arranged at equal angular spacings from one another, and the tool stations 50 of the one row are offset from the tool stations 52 of the other row by half of this angular spacing. For all eventualities, it is also pointed out that in preferred embodiments of the inventive tool turret, also the tool axes 64*a* of all tools 64 form with the center plane 62 of the turret head 44 an angle of 45°, but the tools of the one row of tool stations point away from the one side of the center plane 62 and the tools of the other row of tool stations from the other side of the center plane 62.

In preferred embodiments, the contact surfaces 54 of the tool stations 50 of the one row define a first regular pyramid 70, and the contact surfaces 54 of the tool stations 54 of the other row a second regular pyramid 72. The pyramids 70 and 72 are indicated in dot-and-dash lines in FIG. 4*a*. They have the same shape, their bases coincide with the center plane 62 and their axes with the turret indexing axis 46, and, finally, their apexes 70*a* and 72*a*, respectively, are spaced equidistantly from the center plane 62.

It is also to be noted that in the preferred embodiment shown in the drawings, the circumferential surface areas 54' of the turret head 44 lying between the contact surfaces 54 are likewise planar and likewise define regular pyramids, but this need not be the case. In the embodiment shown in the drawings, the planar surfaces 54' could, however, belong to further tool stations for non-driven tools which then lie between the successive tool stations 50 and 52, respectively, of the two rows of tool stations. In this case, the tool turret shown in FIGS. 4*a* and 4*b* would have a total of 24 tool stations, namely twelve for driven tools and twelve for non-driven tools.

Before proceeding to a description of the internal construction of the turret head 44 and the drive for the tools 64 with reference to FIGS. 6 to 8 and 9*a* and 9*b*, an explanation will first be given with reference to FIGS. 5*a* to 5*c* of the various ways in which the inventive tool turret can be employed. From FIGS. 5*a* to 5*c* it will also be apparent that each of the tool stations 50 and 52 can also be equipped with a non-driven tool instead of a driven tool.

FIGS. 5*a* to 5*c* again show a lathe designed as an opposed spindle lathe with two workpiece spindles 10 and 12, each of which holds a workpiece 10*a* and 12*a*, respectively, to be machined, and is mounted for rotation about a spindle axis 14 common to both workpiece spindles. However, the lathe shown in FIGS. 5*a* to 5*c* is provided with two inventive tool turrets whose turret heads are designated 44I and 44II. The turret head 44I is rotatable about a turret indexing axis 46I, the turret head 44II about a turret indexing axis 46II. When turret heads of the preferred embodiment are used, these two turret indexing axes form with the direction of the Z-axis an angle of 45° and lie in the X/Z-plane—the X/Z-plane is defined by the direction of the X-axis and the spindle axis 14.

With the tool equipment shown in FIGS. 5*a* and 5*b*, the turret head 44I is equipped with an outside machining tool 80I in the form of a turning tool and with an inside machining tool 82I in the form of a drill rod, and the same applies accordingly to the turret head 44II, the outside machining tool being designated 80II and the inside machining tool 82II. The toolholders for the outside machining tools are designated 80*a*, the toolholders for the inside machining tools 82*a*.

With the tool equipment shown in FIG. 5*c*, the turret head 44I carries two driven machining tools 84I and 86I, which are both shown as drills, and the same applies to the turret head 44II, the two machining tools being designated 84II and 86II With the tool equipment shown in FIG. 5*c*, the toolholders 88 may be of identical design for all machining tools.

The maximum indexing radius $R_I$ and half of the maximum indexing length $L_1/2$ are also indicated for the turret head 44II in FIG. 5*c*.

It will be apparent from FIGS. 5*a* to 5*c* that the following machining operations can be carried out with the two tool turrets, and, more specifically, also when neither of the two tool turrets has a B-axis:

As will be apparent from FIG. 5*a*, both outside machining and inside machining can be carried out on the workpiece 10*a* with the tools of the turret head 44I, and the same applies accordingly to the workpiece 12*a* in conjunction with the tools of the turret head 44II. However, since each of the two tool turrets is to be carried by a compound slide system and is, consequently, displaceable in both the direction of the Z-axis and the direction of the X-axis, outside machining can, as will be apparent from FIG. 5*b*, also be carried out on the workpiece 10*a* with tools of the turret head 44II, while outside machining operations can be carried out on the workpiece 12*a* with tools of the turret head 44I.

In connection with FIG. 5*c*, it must be borne in mind that other inside machining tools can, of course, also replace drills as inside machining tools, for example, lathe tools in the form of so-called drill rods or milling cutters. It will be apparent from FIG. 5*c* that the workpiece 10*a* can be machined from its circumference with the tool 84I in order to, for example, produce a transverse bore, whereas the workpiece 10*a* can be machined from its right end face in accordance with FIG. 5*c* with the inside machining tool 86I in order to, for example, produce a longitudinal bore parallel to the spindle axis 14. The same applies accordingly to the workpiece 12*a* at whose circumference the tool 84II can be used, while the inside machining tool 86II can be used at the left end face of the workpiece 12*a* in accordance with FIG. 5*c*. For tools such as tools 84I and 84II, in analogy with FIG. 5*b*, tools of the turret head 44I can also be used on the workpiece 12*a*, and tools of the turret head 44II also on the workpiece 10*a*, even if neither of the two tool turrets has a B-axis.

The inside construction of a particularly advantageous embodiment of the inventive tool turret will now be explained with reference to FIG. 6, and, in this connection, reference is to be had to the above explanations for a description of the features of the outside design of the tool turret with reference to FIGS. 4*a* and 4*b*.

Of the turret housing 42, FIG. 6 shows a housing body 100 with a bearing ring 102 attached by means of screws 104 to its front end face facing the turret head 44. Fixedly connected to the turret housing 42, in a manner not shown, is an inside bearing pipe 108 which like the bearing ring 102 is constructed and arranged concentrically with the turret indexing axis 46. The inside bearing pipe 108 is surrounded by an input shaft 110 of a tool driving device which is coaxial with the turret indexing axis 46. The input shaft 110 has a crown gear toothing 110a at its front left end face in accordance with FIG. 6 and is fixedly connected to a retaining sleeve 106.

The turret head 44 has a turret head body 112 to which a bearing flange 116 concentric with the turret indexing axis 46 is attached by means of screws 114. A drive sleeve 118 attached to the bearing flange 116 and coaxial with the turret indexing axis 46 serves to rotate the turret head 44 about the turret indexing axis 46. The drive sleeve 118 is in drive communication with a turret indexing device in the form of a rotary drive, not shown, and is surrounded by a retaining ring 120 which is to be attached by screws 122 to an area of the housing body 100 which is not shown. The bearing ring 102 attached to the housing body 100 thus acts both as bearing means and as axial securing means for the turret head body 112 rotatable about the turret indexing axis 46.

Arranged between the turret head body 112 and the input shaft 110 are two ball bearings 124 which are secured in the axial direction, on the one hand, by the retaining sleeve 106 and a shoulder of the input shaft 110, and, on the other hand, by the bearing flange 116 and a retaining ring 126 attached in a manner not shown in further detail to the turret head body 112.

A turret head locking device serves to fix the turret head 44 in angle of rotation positions specified by the machine control on the turret housing 42 so the turret head is unable to rotate about the indexing axis 46 even under the influence of machining forces.

Components of the turret head locking device are the bearing flange 116, the bearing ring 102 and a ring piston 128 which is reciprocatable in the direction of the indexing axis 46 in a ring-shaped cylinder chamber 130. FIG. 6 shows on the right of the ring piston 128 a cylinder chamber 130a and between shoulders of the ring piston 128 and the retaining ring 120 a small, likewise ring-shaped cylinder chamber 130b, which can be alternately acted upon with pressure oil via hydraulic oil ducts, not shown, in order to reciprocatingly move the ring piston 128. On account of the scale of FIG. 6, it was not possible to show three cooperating face toothings, one of which is arranged at the left end face of the ring piston 128 in accordance with FIG. 6. Located opposite the face toothing of the ring piston 128 are two face toothings at the right end face of the bearing ring 102 and at the right end face of the bearing flange 116 in accordance with FIG. 6. These have the same pitch as the face toothing of the ring piston 128. As the teeth of all of these three face toothings extend in the radial direction in relation to the turret indexing axis 46, the face toothing of the ring piston 128 can simultaneously engage the two face toothings of the bearing flange 116 and the bearing ring 102 and thus prevent the bearing flange 116 and hence the turret head body 112 from being rotatable relative to the bearing ring 102 and hence relative to the turret housing 42. However, when the ring piston 128 is moved to the right in accordance with FIG. 6, its face toothing releases the bearing flange 116 so the turret head body 112 is rotatable about the turret indexing axis 46. Such three-part HIRTH toothings for locking and releasing turret heads are known from the prior art.

A bearing body 134 is fixedly connected in a manner not shown in further detail to the inside bearing pipe 108 which is stationary in relation to the turret housing 42. A shifting rod 136 projects into a bore 134a of this bearing body which is coaxial with the turret indexing axis 46. The shifting rod 136 extends through the inside bearing pipe 108 and is guided for displacement in this bearing pipe 108 and in the bearing body bore 134a in the direction of the turret indexing axis is 46. FIG. 6 shows the shifting rod 136 in its right end position from which it is advanceable to the left in accordance with FIG. 6, for example, by means of a pressure medium cylinder, not shown. On either side of the shifting rod 136 a bearing housing 138 consisting of several parts is guided in a guide 134b of the bearing body 134 extending radially in relation to the turret indexing axis 46 for displacement in this radial direction. It consists of a bearing sleeve 138a guided in the guide 134b and a locking body 138b attached to the bearing sleeve 138a. By means of roller bearings 140 and 142 held by the bearing housing 138, a drive shaft 144 oriented radially in relation to the turret indexing axis 46 is rotatably and axially immovably mounted in each of the bearing housings 138. The two radial drive shafts 144 are of identical design, and their axes are in alignment with one another and lie in the center plane 62 of the turret head 44 indicated in FIG. 4a. Each of the radial drive shafts 144 has (see, in particular, FIG. 8) a toothed gear 144a with a spur gear toothing in permanent engagement with the crown gear toothing 110a of the input shaft 110, and a bevel gear 144b at its radially outer end.

An angular lever 148 is mounted on each of the bearing bodies 134 in such a way that it can pivot about an axis 148a extending transversely to the turret indexing axis 46, and this angular lever 148 engages with rollers 148b and 148c in appropriately designed recesses on the shifting rod 136 and on the bearing sleeve 138a of the associated bearing housing 138, respectively. FIG. 6 shows a state in which the bearing housings 138 and hence the radial drive shafts 144 assume their radially outer positions. Owing to the coupling of the shifting rod 136 with the bearing housings 138 via the two angular levers 148, the two bearing housings and hence the two radial drive shafts 144 can, however, be retracted inwardly in the radial direction by the shifting rod 136 being moved to the left in accordance with FIG. 6.

FIG. 6 shows two workpiece receiving means 56 and 56', each with a planar contact surface 54 and a receiving bore 58 whose axis 60 extends perpendicularly to the contact surface 54 of the respective tool receiving means 56. The two tool receiving means 56 and 56' belong to different rows of tool stations, i.e., the tool receiving means 56 belongs to one of the tool stations 50, the tool receiving means 56' to one of the tool stations 52 of the tool turret shown in FIGS. 4a and 4b. However, in reality, the tool receiving means 56' and hence the axis 60 of its receiving bore 58 lie behind the drawing plane of FIG. 6 (see the sectional lines 6—6 and 6'—6' in FIG. 4b). Only a shaft 66a of the toolholder 66 (see FIGS. 4a and 4b) and a tool shaft 64b which is rotationally fixedly connected to one of the tools 64 shown in FIGS. 4a and 4b are shown for each of the machining tools inserted into the two tool receiving means 56 and 56'. Each of the tool shafts 64b carries a toothed gear 64c which, for cost reasons, is a spur gear in the preferred embodiment, but could also be a bevel gear.

In the position of the shifting rod 136 shown in FIG. 6, the bevel gear 144b of the upper radial drive shaft 144 is in engagement with the toothed gear 64c of the upper tool shaft 64b. When the turret head 44 shown in FIG. 6 is the same turret head as illustrated in FIGS. 4a and 4b, the bevel gear 144b of the lower radial drive shaft 144 is then not in engagement with the toothed gear 64c of the lower tool shaft 64b. If, however, the turret head 44 shown in FIG. 6 is designed such that a tool station 50 of the one row of tool stations and a tool station 52 of the other row of tool stations are diagonally opposed to one another, as is actually shown in FIG. 6, in the position of the shifting rod 136 shown in FIG. 6 both tool shafts 64b shown in FIG. 6 would be coupled with both radial drive shafts 144. Instead of two radial drive shafts 144, a single radial drive shaft which is reciprocatable between three shift positions, namely between an upper, a middle and a lower shift position could also be used for a turret head 44 of such design—in the upper shift position it would then be coupled with the upper tool shaft 64b, in the lower shift position with the lower tool shaft 64b, and in the middle position there would be no tool shaft in drive connection with this radial drive shaft.

When the shifting rod 136 is advanced to the left from its position shown in FIG. 6, the bevel gears 144b of both radial drive shafts 144 are retracted inwardly in the radial direction to such an extent that the turret head 44 is rotatable about its indexing axis 46 without one of the toothed gears 64c of the tool shafts 64b colliding with the bevel gears 144b. It is pointed out once again that with a turret head 44 as shown in FIGS. 4a and 4b, in each indexing position of the turret head 44 always only one of the tool shafts 64b is driven as always only one of the toothed gears 64c can mesh with one of the bevel gears 144b.

As mentioned above, many driven tools must be applied in a specified angle of rotation position, for example, tools for making threads. Since rotation of the turret head 44 about its indexing axis 46 requires the two bevel gears 144b to be retracted inwardly in the radial direction, and all driven tools which are not in working position are uncoupled from the two radial drive shafts 144, measures were taken in the preferred embodiment of the inventive tool turret to secure all those tool shafts 64b not in drive connection with the input shaft 110 against unintentional rotation. The locking bodies 138b of the two bearing housings 138, parts of the turret housing 42 fixedly connected to the housing body 100 and corresponding to these locking bodies with respect to function, and inner end areas of the tool shafts 64b of non-circular cross section serve this purpose. These means for securing against rotation will now be described with reference to FIGS. 6 to 9b, in particular, FIGS. 7 and 9a and 9b.

The locking bodies 138b each have two webs 160 which are adjoined by circular arc-shaped ribs 162, shown in FIG. 7, of a part of the turret housing 42 fixedly connected, in a manner not shown, to th e housing body 100 when the bearing housings 138 assume their radially inner position shown in FIG. 8. FIGS. 9a and 9b show end views of an inner end area 64b' of a tool shaft 64b and indicate that the shaft end areas 64b' have at their circumference two opposed flat parts 164, one of which cooperates with one of the webs 160 for rotary locking of the respective tool shaft when the respective locking body 138b assumes its radially inner position in which the toothed gear 64c of the respective tool shaft 64b is not in engagement with the adjacent bevel gear 144b. If the turret head 44 is then indexed further about its indexing axis 46, the respective tool shaft 64b is prevented from unintentional rotation by the ribs 162. While FIGS. 8 and 9a show the locking of the tool shaft 64b shown at the top of FIG. 6, namely that state in which the locking body 138b shown at the top of FIG. 6 assumes its radially inner position, FIG. 9b shows the state illustrated in FIG. 6 in which the tool shaft 64b shown at the top of FIG. 6 is rotatable because the locking body 138b shown at the top of FIG. 6 assumes its radially outer position.

Finally, FIG. 6 also shows a turret head cover 166 which can rotate with the turret head 44 or be stationary in relation to the turret housing 42.

FIGS. 10 and 11 show in full, albeit highly simplified, the lathe designed as opposed spindle lath e and shown in FIGS. 5a to 5c, but with the modification that the lathe according to FIGS. 10 and 11 has for each of the two inventive tool turrets both a B-axis and a Y-axis, as explained with reference to FIG. 4a. Therefore, not only the direction of the Z-axis but also the directions of the X-axis, the Y-axis and the B-axis are drawn for each of the tool turrets in FIGS. 10 and 11. As far as possible, the same reference numerals were used in FIGS. 10 and 11 as in FIGS. 4a and 5a to 5c.

The lathe shown in FIGS. 10 and 11 has a machine bed 200 carrying for each of the workpiece spindles 10 and 12 a headstock 202 in which the respective workpiece spindle is mounted for rotation about the spindle axis 14 common to the two spindles. Above all, FIG. 11 shows, albeit somewhat schematically, two compound slide systems 204 of identical design, each of which is respectively associated with one of the two tool turrets 40. Each of the compound slide systems 204 has a so-called base slide 204a which is guided on the machine bed 200 for displacement in the direction of the Z-axis, and a so-called top slide 204b which is carried by the base slide and is guided on the base slide 200 for displacement in the direction of the X-axis. The column 48 for the tool turret 40 belonging to the respective compound slide system is mounted in this top slide 204b, more specifically, for displacement in the direction of the Y-axis as well as rotation about the B-axis. For this reason, the base slide 204a has an elongate-hole-type opening 204a' through which the column 48 extends together with its bearing means provided on the top slide 204b, and this opening 204a' has in the direction of the X-axis a longitudinal extent corresponding to the desired maximum path of the column 48 in the direction of the X-axis.

As will be readily apparent from FIG. 10, owing to the fact that the lathe has a B-axis for each of the two tool turrets 40, both workpieces held by the workpiece spindle 10 and workpieces held by the workpiece spindle 12 can be machined with all tools of each of the two tool turrets. This will be explained again with reference to FIG. 12 which shows one of the two tool turrets 40 of the lathe shown in FIGS. 10 and 11 in two different positions and the two workpiece spindles 10 and 12 holding a workpiece 10a to be machined and a workpiece 12a which is just in the process of being machined, respectively. For details of the tool equipment of the tool turret, reference may be had to FIGS. 5a to 5c and so no further description of FIG. 12 is necessary in this respect.

From FIGS. 5a to 5c and 10 to 12 it will be evident that all machining operations demanded of lathes today can be carried out on a so-called 4-axes lathe with two inventive tool turrets, each of which is carried by a compound slide system, more specifically, with tools which are held in a torsion-free manner by the tool turrets, and which, in the event these are driven tools, do also not require an angular gearing in the toolholder.

Furthermore, the use of an inventive tool turret makes it possible to design the working area of lathes in such a way as to obtain particularly expedient geometrical relations between, on the one hand, the tool turret heads and turret housings, and, on the other hand, the workpiece spindles and the headstocks in which these are mounted. Also, the guides to be provided on the machine bed for the compound slide systems can be arranged in such an expedient way that particularly solid and functionally suitable constructions are possible without having to take collision problems into consideration.

In lathes with a B-axis for an inventive tool turret, the latter results in significantly smaller swivel radii and swivel angles than when conventional tool turrets are used because the tools not located in working position stand at an incline in the area and hence a shorter machine length is required for swivelling the tool turret about the B-axis. The use of an inventive tool turret also results in the swivel angle about the B-axis required in order to orientate the turret head first used at the one workpiece spindle towards an opposed spindle being reduced from 180° when a disc turret is used to 90° when an inventive tool turret is used, and all required angular positions can be achieved for the tools of both rows of tool stations of an inventive tool turret with adjusting angles which are half the size of those of the prior art.

What is claimed is:

1. Tool turret for a machine tool, comprising a turret head mounted on a turret head carrying device of said tool turret for rotation about a turret indexing axis and lockable by means of a turret head looking device relative to said carrying device in a predetermined number of indexing positions which are equidistant with respect to angle of rotation in relation to said indexing axis, said turret head tapering on both sides of a diameter plane of said turret head extending perpendicularly to said turret indexing axis, and said turret head having on each side of this diameter plane a circular ring-shaped row of tool stations which are equidistant with respect to angle of rotation, said row of tool stations being concentric with said indexing axis, and each of said tool stations having a tool receiving means associated with one of said indexing positions for clamping a toolholder for a machining tool, wherein (a) at least two of said tool receiving means are designed for clamping a tool rotatably drivable about a tool axis, the toolholder of said tool having a tool drive shaft for engaging the respective tool receiving means, and a tool driving device is provided for said tool drive shafts;

(b) each tool station has as part of an interface between the toolholder and turret head a planar contact surface formed by the outer surfaces of said turret head for the respective toolholder;

(c) the contact surfaces of a first row of tool stations define a first regular pyramid, and the contact surfaces of the other, second row of tool stations define a second regular pyramid, both pyramids having the same shape and apexes pointing away from one another, and the axis of each pyramid coinciding with said turret indexing axis so that the two pyramids adjoin one another at said diameter plane of the turret head, said pyramid apexes being equidistantly spaced from said diameter plane;

(d) each row of tool stations has at least one tool receiving means for a drivable tool;

(e) each of said tool receiving means for drivable tools has an axis extending perpendicularly to said contact surface of the respective tool station;

(f) two adjacent tool receiving means for drivable tools belong to different rows of tool stations and are offset from one another with respect to angle of rotation in relation to said turret indexing axis, the axes of these tool receiving means penetrating said diameter plane of said turret head at points which lie on a circle concentric with said indexing axis;

(g) said tool driving device has at least one drive shaft extending perpendicularly to said turret indexing axis, said drive shaft being displaceable in the longitudinal direction thereof for coupling with and uncoupling from a tool drive shaft of a drivable tool.

2. Tool turret as defined in claim 1, wherein the axis of said drive shaft of said tool driving device lies in said diameter plane of said turret head.

3. Tool turret as defined in claim 1, wherein said drive shaft of said tool driving device is provided at its end region facing away from said turret indexing axis with a toothed gear in the form of a bevel gear for coupling with a toothed gear of a tool drive shaft.

4. Tool turret as defined in claim 3, wherein said axes of said tool receiving means for drivable tools are arranged such that upon rotation of said turret head about its indexing axis, axes of said tool receiving means moving one after the other past said toothed gear of said drive shaft of said tool driving device pass this toothed gear alternately on its one and its other side.

5. Tool turret as defined in claim 1, having a bearing body mounted on said turret head carrying device for displacement in the axial direction of said drive shaft of said tool driving device, said drive shaft being rotatably, but axially immovably mounted in said bearing body, and by a drive shifting device for displacement of said bearing body between an uncoupling position in which said drive shaft is uncoupled from all tool drive shafts and at least one coupling position in which said drive shaft is coupled with a tool drive shaft.

6. Tool turret as defined in claim 5, having a shifting rod extending along said turret indexing axis and movable back and forth in the direction thereof, said shifting rod being coupled with said bearing body via a coupling member pivotable about a pivot axis extending transversely to said turret indexing axis.

7. Tool turret as defined in claim 1, wherein said drive shaft of said tool driving device is provided at its circumference with a spur gear toothing for driving said drive shaft by means of a crown gear toothing of an input shaft coaxial with said turret indexing axis.

8. Tool turret as defined in claim 1, wherein each row of tool stations has several tool receiving means for drivable tools.

9. Tool turret as defined in claim 8, wherein the number of tool receiving means for drivable tools of each row of tool stations is equal to half of the even-numbered number N of indexing positions, in that in each row of tool stations the angular spacings of these tool receiving means from one another are 720°/N, and wherein said tool receiving means for drivable tools of said one row of tool stations are offset from said tool receiving means for drivable tools of said other row of tool stations with respect to angle of rotation by an angle of 360°/N in relation to said turret indexing axis.

10. Tool turret as defined in claim 9, wherein each row of tool stations has between its tool receiving means for drivable tools tool receiving means for non-drivable tools.

11. Tool turret as defined in claim 1, wherein said diameter plane of said turret head is its center plane.

12. Tool turret as defined in claim 1, wherein the side faces of each pyramid each form an angle of 45° with said turret indexing axis.

13. Lathe comprising a machine bed, at least one tool spindle mounted for rotation about a spindle axis defining the direction of a Z-axis of said lathe, said tool spindle being provided at its one end with a tool clamping device for holding a workpiece to be machined, at least one compound slide system with at least one Z-slide guided for displacement in the direction of the Z-axis and an X-slide guided for displacement in the direction of an X-axis extending perpendicularly to the Z-axis, and further comprising a tool turret carrier mounted on said compound slide system for rotation about a B-axis extending perpendicularly to the Z-axis and to the X-axis and hence held for displacement in the direction of the Z-axis and the X-axis, said tool turret carrier being provided with a tool turret comprising a turret head mounted on a turret head carrying device of said tool turret for rotation about a turret indexing axis and lockable by means of a turret head locking device relative to said carrying device in a predetermined number of indexing positions which are equidistant with respect to angle of rotation in relation to said indexing axis, said turret head tapering on both sides of a diameter plane of said turret head extending perpendicularly to said turret indexing axis, and said turret head having on each side of this diameter plane a circular ring-shaped row of tool stations which are equidistant with respect to angle of rotation, said row of tool stations being concentric with said indexing axis, and each of said tool stations having a tool receiving means associated with one of said indexing positions for clamping a toolholder for a machining tool, wherein (a) at least two of said tool receiving means are designed for clamping a tool rotatably drivable about a tool axis, the toolholder of said tool having a tool drive shaft for engaging the respective tool receiving means, and a tool driving device is provided for said tool drive shafts;

(b) each tool station has as part of an interface between the toolholder and turret head a planar contact surface formed by the outer surfaces of said turret head for the respective toolholder;

(c) the contact surfaces of a first row of tool stations define a first regular pyramid, and the contact surfaces of the other, second row of tool stations define a second regular pyramid, both pyramids having the same shape and apexes pointing away from one another, and the axis of each pyramid coinciding with said turret indexing axis so that the two Pyramids adjoin one another at said diameter plane of the turret head, said pyramid apexes being equidistantly spaced from said diameter plane;

(d) each row of tool stations has at least one tool receiving means for a drivable tool;

(e) each of said tool receiving means for drivable tools has an axis extending perpendicularly to said contact surface of the respective tool station;

(f) two adjacent tool receiving means for drivable tools belong to different rows of tool stations and are offset from one another with respect to angle of rotation in relation to said turret indexing axis, the axes of these tool receiving means penetrating said diameter plane of said turret head at points which lie on a circle concentric with said indexing axis;

(g) said tool driving device has at least one drive shaft extending perpendicularly to said turret indexing axis, said drive shaft being displaceable in the longitudinal direction thereof for coupling with and uncoupling from a tool drive shaft of a drivable tool.

14. Lathe as defined in claim 13, having two coaxial workpiece spindles with workpiece clamping devices facing one another and at least two compound slide systems, each of which is provided with a tool turret carrier carrying a tool turret and rotatable about a B-axis, both of said compound slide systems being arranged such that both workpieces held by the one workpiece spindle and workpieces held by the other workpiece spindle are machinable with tools of each of said two tool turrets.

15. Lathe comprising a machine bed, two coaxial workpiece spindles mounted for rotation about a common spindle axis defining the direction of a Z-axis of said lathe, and each provided with a workpiece clamping device for holding a workpiece to be machined, said workpiece spindles being arranged opposite each other with workpiece clamping devices facing one another, and further comprising two compound slide systems, each of which has a Z-slide guided for displacement in direction of the Z-axis and an X-slide guided for displacement in the direction of an X-axis extending perpendicularly to the Z-axis, wherein each of said two compound slide systems carries a tool turret comprising a turret head mounted on a turret head carrying device of said tool turret for rotation about a turret indexing axis and lockable by means of a turret head locking device relative to said carrying device in a predetermined number of indexing positions which are equidistant with respect to angle of rotation in relation to said indexing axis, said turret head tapering on both sides of a diameter plane of said turret head extending perpendicularly to said turret indexing axis, and said turret head having on each side of this diameter plane a circular ring-shaped row of tool stations which are equidistant with respect to angle of rotation, said row of tool stations being concentric with said indexing axis, and each of said tool stations having a tool receiving means associated with one of said indexing positions for clamping a toolholder for a machining tool, wherein (a) at least two of said tool receiving means are designed for clamping a tool rotatably drivable about a tool axis, the toolholder of said tool having a tool drive shaft for engaging the respective tool receiving means, and a tool driving device is provided for said tool drive shafts;

(b) each tool station has as part of an interface between the toolholder and turret head a planar contact surface formed by the outer surfaces of said turret head for the respective toolholder;

(c) the contact surfaces of a first row of tool stations define a first regular pyramid, and the contact surfaces of the other, second row of tool stations define a second regular Pyramid, both pyramids having the same shape and apexes pointing away from one another, and the axis of each pyramid coinciding with said turret indexing axis so that the two pyramids adjoin one another at said diameter plane of the turret head, said pyramid apexes being equidistantly spaced from said diameter plane;

(d) each row of tool stations has at least one tool receiving means for a drivable tool;

(e) each of said tool receiving means for drivable tools has an axis extending perpendicularly to said contact surface of the respective tool station;

(f) two adjacent tool receiving means for drivable tools belong to different rows of tool stations and are offset from one another with respect to angle of rotation in relation to said turret indexing axis, the axes of these tool receiving means penetrating said diameter plane of said turret head at points which lie on a circle concentric with said indexing axis;

(g) said tool driving device has at least one drive shaft extending perpendicularly to said turret indexing axis, said drive shaft being displaceable in the longitudinal direction thereof for coupling with and uncoupling from a tool drive shaft of a drivable tool.

16. Lathe as defined in claim 15, wherein a tool turret carrier carrying a tool turret and mounted for rotation about a B-axis extending perpendicularly to the Z-axis and to the X-axis and hence held for displacement in the direction of the Z-axis and the X-axis is provided at least at one of said two compound slide systems.

17. Lathe as defined in claim 15, wherein said two compound slide systems are arranged such that workpieces held by the one workpiece spindle and workpieces held by the other workpiece spindle are machinable with tools of each of said two tool turrets.

* * * * *

UNITED STATES PATENT AND TRADEMARK OFFICE
CERTIFICATE OF CORRECTION

PATENT NO.   : 6,128,812
DATED         : October 10, 2000
INVENTOR(S)  : Helmut Friedrich Link, et al.

It is certified that error appears in the above-identified patent and that said Letters Patent is hereby corrected as shown below:

<u>Column 16,</u>
Line 22; replace "by" with --having--.

<u>Column 17,</u>
Line 38; replace "Pyramids" with ---pyramids---.

<u>Column 18,</u>
Line 43; replace "Pyramids" with ---pyramids---.

Signed and Sealed this

Seventh Day of August, 2001

*Attest:*

NICHOLAS P. GODICI
*Attesting Officer*   *Acting Director of the United States Patent and Trademark Office*